United States Patent
Wagman et al.

(10) Patent No.: US 10,579,097 B2
(45) Date of Patent: Mar. 3, 2020

(54) ELECTRONIC DEVICE WITH CONTACTS FLUSH WITH HOUSING

(71) Applicant: Apple Inc., Cupertino, CA (US)

(72) Inventors: Daniel Wagman, Los Gatos, CA (US); Oliver Ross, San Francisco, CA (US); Eric S. Jol, San Jose, CA (US); Hani Esmaeili, Sunnyvale, CA (US); Brett Degner, Menlo Park, CA (US); Ibuki Kamei, San Jose, CA (US)

(73) Assignee: APPLE INC., Cupertino, CA (US)

( * ) Notice: Subject to any disclaimer, the term of this patent is extended or adjusted under 35 U.S.C. 154(b) by 541 days.

(21) Appl. No.: 15/256,432

(22) Filed: Sep. 2, 2016

(65) Prior Publication Data

US 2017/0068276 A1    Mar. 9, 2017

Related U.S. Application Data

(60) Provisional application No. 62/254,033, filed on Nov. 11, 2015, provisional application No. 62/215,714, filed on Sep. 8, 2015, provisional application No. 62/215,592, filed on Sep. 8, 2015, provisional appli (Continued)

(51) Int. Cl.
*G06F 1/16*         (2006.01)
*H01R 13/62*        (2006.01)
(Continued)

(52) U.S. Cl.
CPC .......... *G06F 1/1607* (2013.01); *G06F 1/1615* (2013.01); *G06F 1/1626* (2013.01);
(Continued)

(58) Field of Classification Search
CPC .... G06F 1/1615; G06F 1/1626; G06F 1/1632; G06F 1/1643; G06F 1/184; G06F 1/203;
(Continued)

(56) References Cited

U.S. PATENT DOCUMENTS

| 5,213,314 A | 5/1993 | Kano et al. |
| 5,295,844 A | 3/1994 | Koshikawa et al. |

(Continued)

FOREIGN PATENT DOCUMENTS

| AU | 2011100424 A4 | 4/2015 |
| AU | 2016/225784 | 5/2018 |

(Continued)

OTHER PUBLICATIONS

U.S. Appl. No. 15/138,216, entitled "Low-Profile Power and Data Contacts", filed Apr. 26, 2016 (unpublished).
(Continued)

*Primary Examiner* — Jinhee J Lee
*Assistant Examiner* — Ingrid D Wright
(74) *Attorney, Agent, or Firm* — Kilpatrick Townsend & Stockton LLP

(57) ABSTRACT

An electronic device comprising a device enclosure having an exterior surface; a contact area positioned at the exterior surface and having first and second ends, the contact area having a plurality of contacts arranged between the first and second ends and substantially flush with the exterior surface; and an alignment feature within the enclosure comprising first and second magnets positioned on opposing sides of the contact area, the first magnet positioned adjacent to the first end of the contact area and the second magnet positioned adjacent to the second end of the contact area.

18 Claims, 25 Drawing Sheets

Related U.S. Application Data cation No. 62/215,688, filed on Sep. 8, 2015, provisional application No. 62/214,671, filed on Sep. 4, 2015.

(51) Int. Cl.
*H01R 13/24* (2006.01)
*G06F 3/02* (2006.01)

(52) U.S. Cl.
CPC .......... *G06F 1/1632* (2013.01); *G06F 1/1643* (2013.01); *G06F 1/1656* (2013.01); *G06F 1/1679* (2013.01); *G06F 1/1681* (2013.01); *G06F 1/1683* (2013.01); *G06F 3/0202* (2013.01); *H01R 13/2442* (2013.01); *H01R 13/6205* (2013.01)

(58) Field of Classification Search
CPC .... G06F 1/1681; G06F 1/1683; G06F 3/0202; G06F 1/1656; G06F 1/1607; G06F 1/1679; H01R 13/2442; H01R 13/6205
See application file for complete search history.

(56) References Cited

U.S. PATENT DOCUMENTS

| | | | |
|---|---|---|---|
| 5,876,243 A | 3/1999 | Sangawa | |
| 5,980,335 A | 11/1999 | Barbieri et al. | |
| 6,780,019 B1 | 8/2004 | Ghosh et al. | |
| 6,976,799 B2 | 12/2005 | Kim et al. | |
| 7,306,494 B2 | 12/2007 | Soh et al. | |
| 7,311,526 B2 * | 12/2007 | Rohrbach | H01R 13/6205 439/39 |
| 7,355,137 B2 | 4/2008 | Kawasaki et al. | |
| 7,661,968 B1 | 2/2010 | Duan et al. | |
| 8,138,717 B2 | 3/2012 | Chatterjee et al. | |
| 8,263,886 B2 | 9/2012 | Lin et al. | |
| 8,344,836 B2 | 1/2013 | Ive et al. | |
| 8,427,825 B2 | 4/2013 | Szczypinski | |
| 8,498,100 B1 | 7/2013 | Reed et al. | |
| 8,570,725 B2 | 10/2013 | Aagaard et al. | |
| 8,699,215 B2 | 4/2014 | Aagaard et al. | |
| 8,724,302 B2 | 5/2014 | Whitt, III et al. | |
| 8,780,540 B2 | 7/2014 | Aagaard et al. | |
| 8,780,541 B2 | 7/2014 | Aagaard et al. | |
| 8,830,668 B2 | 9/2014 | Aagaard et al. | |
| 8,873,227 B2 | 10/2014 | Aagaard et al. | |
| 8,878,637 B2 | 11/2014 | Sartee et al. | |
| 8,903,517 B2 | 12/2014 | Perek et al. | |
| 8,947,864 B2 | 2/2015 | Aagaard et al. | |
| 8,953,310 B2 | 2/2015 | Franklin et al. | |
| 8,975,991 B2 | 3/2015 | Ive et al. | |
| 8,988,876 B2 | 3/2015 | Corbin et al. | |
| 9,000,871 B2 | 4/2015 | Cencioni | |
| 9,036,340 B1 | 5/2015 | Oakeson et al. | |
| 9,075,566 B2 | 7/2015 | Aagaard et al. | |
| 9,149,100 B2 | 10/2015 | Marshall et al. | |
| 9,158,384 B2 | 10/2015 | Aagaard et al. | |
| 9,176,900 B2 | 11/2015 | Aagaard et al. | |
| 9,176,901 B2 | 11/2015 | Wise et al. | |
| 9,335,793 B2 | 5/2016 | Rothkopf et al. | |
| 9,455,759 B2 | 9/2016 | Wu et al. | |
| 9,485,338 B2 | 11/2016 | Balaji et al. | |
| 9,977,460 B2 | 5/2018 | Wagman et al. | |
| 2004/0209489 A1 | 10/2004 | Clapper | |
| 2005/0026499 A1 | 2/2005 | Choi et al. | |
| 2008/0232061 A1 | 9/2008 | Wang et al. | |
| 2009/0247004 A1 | 10/2009 | Lou et al. | |
| 2009/0257207 A1 | 10/2009 | Wang et al. | |
| 2010/0226509 A1 | 9/2010 | Filson et al. | |
| 2010/0328230 A1 | 12/2010 | Faubert et al. | |
| 2011/0051360 A1 | 3/2011 | Dabov et al. | |
| 2012/0194448 A1 | 8/2012 | Rothkopf | |
| 2013/0035006 A1 | 2/2013 | Park et al. | |
| 2013/0162554 A1 | 6/2013 | Lauder et al. | |
| 2013/0164949 A1 * | 6/2013 | Riering-Czekalla | H01R 13/6205 439/39 |
| 2013/0183861 A1 | 7/2013 | Chang et al. | |
| 2013/0322000 A1 | 12/2013 | Whitt, III et al. | |
| 2014/0106594 A1 | 4/2014 | Skvoretz et al. | |
| 2014/0204514 A1 | 7/2014 | Whitt, III et al. | |
| 2014/0273546 A1 * | 9/2014 | Harmon | H01R 13/6205 439/39 |
| 2014/0285957 A1 | 9/2014 | Rohrbach et al. | |
| 2014/0293536 A1 * | 10/2014 | Bramah | G06F 1/1632 361/679.55 |
| 2014/0377992 A1 | 12/2014 | Chang et al. | |
| 2015/0093922 A1 | 4/2015 | Bosscher et al. | |
| 2015/0115414 A1 | 4/2015 | Umehara et al. | |
| 2015/0127376 A1 | 5/2015 | Ortenzi et al. | |
| 2015/0194764 A1 | 7/2015 | Magana et al. | |
| 2015/0241931 A1 | 8/2015 | Carnevali et al. | |
| 2017/0068276 A1 | 3/2017 | Esmaeili et al. | |
| 2017/0069993 A1 | 3/2017 | Wagman et al. | |
| 2017/0069994 A1 | 3/2017 | Wagman et al. | |
| 2017/0205847 A1 | 7/2017 | Wagman et al. | |

FOREIGN PATENT DOCUMENTS

| | | |
|---|---|---|
| AU | 2018201067 B2 | 7/2019 |
| CN | 100414778 | 8/2008 |
| CN | 101826364 | 9/2010 |
| CN | 102047645 | 5/2011 |
| CN | 103718384 | 4/2014 |
| CN | 104641511 | 5/2015 |
| CN | 204481868 U | 7/2015 |
| CN | 106505334 A | 3/2017 |
| CN | 106505344 A | 3/2017 |
| CN | 106505349 A | 3/2017 |
| CN | 206963227 U | 2/2018 |
| EP | 1150385 | 10/2001 |
| EP | 2445175 | 4/2012 |
| EP | 2270623 | 3/2015 |
| EP | 3142193 | 3/2017 |
| JP | S50-93595 U1 | 8/1975 |
| JP | 0577772 | 10/1993 |
| JP | H6624774 | 9/1994 |
| JP | 8003932 | 1/1996 |
| JP | 6323776 U | 2/1998 |
| JP | 10208809 | 8/1998 |
| JP | H11329634 | 11/1999 |
| JP | 2001/313137 | 11/2001 |
| JP | 2003/007351 A | 1/2003 |
| JP | 2006120498 | 5/2006 |
| JP | 2014512552 A | 5/2014 |
| JP | 2016/48520 A | 4/2016 |
| JP | 2017076604 | 4/2017 |
| JP | 2017076605 | 5/2017 |
| JP | 2017/126316 | 7/2017 |
| JP | 6273332 B2 | 1/2018 |
| KR | 1020060039930 | 5/2006 |
| KR | 2006/0084010 | 7/2006 |
| KR | 101013036 | 2/2011 |
| KR | 1020130015367 | 2/2013 |
| KR | 2013/0089479 | 8/2013 |
| KR | 20130089479 A | 8/2013 |
| KR | 1020130089479 A | 8/2013 |
| KR | 101531597 B1 | 6/2015 |
| KR | 101890935 B1 | 8/2018 |
| TW | 498709 | 8/2002 |
| TW | 201303559 A | 1/2013 |
| TW | 201714362 A | 4/2017 |
| TW | 201721988 | 6/2017 |
| TW | 201721996 | 6/2017 |
| TW | I670582 B | 9/2019 |
| WO | 2015/127376 A1 | 8/2015 |

OTHER PUBLICATIONS

U.S. Appl. No. 15/138,224, entitled "Low-Profile Spring-Loaded Contacts", filed Apr. 26, 2016, (unpublished).

(56) References Cited

OTHER PUBLICATIONS

U.S. Appl. No. 15/256,470, entitled "Electronic Device With Moveable Contacts At an Exterior Surface ", filed Sep. 2, 2016 (unpublished).
European Patent Application No. 16187185.0, "Partial Search Report", dated Feb. 15, 2017, 7 pages.
U.S. Appl. No. 15/138,216, "Notice of Allowance", dated Apr. 26, 2017, 9 Pages.
AU2016222504, "First Examiner Report", dated Apr. 27, 2017, 4 pages.
AU2016222505, "First Examiner Report", dated Apr. 28, 2017, 3 pages.
CN201621039180.5, "Office Action", dated Mar. 28, 2017, 3 pages.
Office Action in U.S. Appl. No. 105128657, dated Jun. 30, 2017, in 10 pages.
Notice of Allowance in U.S. Appl. No. 15/138,224, dated May 23, 2017, in 7 pages.
Ex-Parte Quayle Action in U.S. Appl. No. 15/256,470, dated Jun. 27, 2017, in 8 pages.
Notice of Allowance in U.S. Appl. No. 15/256,470, dated Jul. 27, 2017, in 8 pages.
First Examination Report, Australia Application No. AU2016225784, dated Jun. 8, 2017, in 3 pages.
Evaluation Report for Utility Model, China Application No. CN2016210417275, dated May 26, 2017, in 19 pages.
Extended European Search Report, in European Application No. EP16187185.0, dated Jun. 13, 2017, in 12 pages.
Office Action, in Korean Application No. KR10-2016-0112084, dated Jul. 18, 2017, in 16 pages.
Office Action, in Tawian Application No. TW105128162, dated May 25, 2017, in 6 pages.
Office Action in U.S. Appl. No. 15/476,829, dated Aug. 31, 2017 in 20 pages.
Office Action for JP2016-173003, dated Aug. 28, 2017, 3 pages.
First Action Interview Office Action Summary for U.S. Appl. No. 15/476,829, dated Nov. 24, 2017, 7 pages.
Office Action for KR10-2016-0113910, dated Nov. 16, 2017, dated Nov. 16, 2017, 17 pages.
Notice of Decision to Grant for JP2016-173003, dated Dec. 11, 2017, 3 pages.
Notice of Allowance for U.S. Appl. No. 15/476,829, dated Feb. 16, 2018, 11 pages.
Office Action for CN201610802353.2 dated Jun. 5, 2018, 12 pages.
Notice of Decision to Grant for KR10-2016-0113910 dated May 21, 2018, 6 pages.
Office Action issued in European Application No. EP16187185.0, dated Nov. 23, 2013 in 5 pages.
Office Action issued in Japan Application No. JP2018 -000527, dated Nov. 12, 2018 in 7 pages.
First Examination Report issued in Australia Application No. AU2018201067, dated Jan. 24, 2019 in 2 pages.
Office Action for TW106146021, dated Feb. 14, 2019, 15 pages.
Notice of Acceptance for AU2018201067 dated Apr. 4, 2019, 3 pages.
Office Action for CN20161080235 dated Apr. 12, 2019, 10 pages.

* cited by examiner

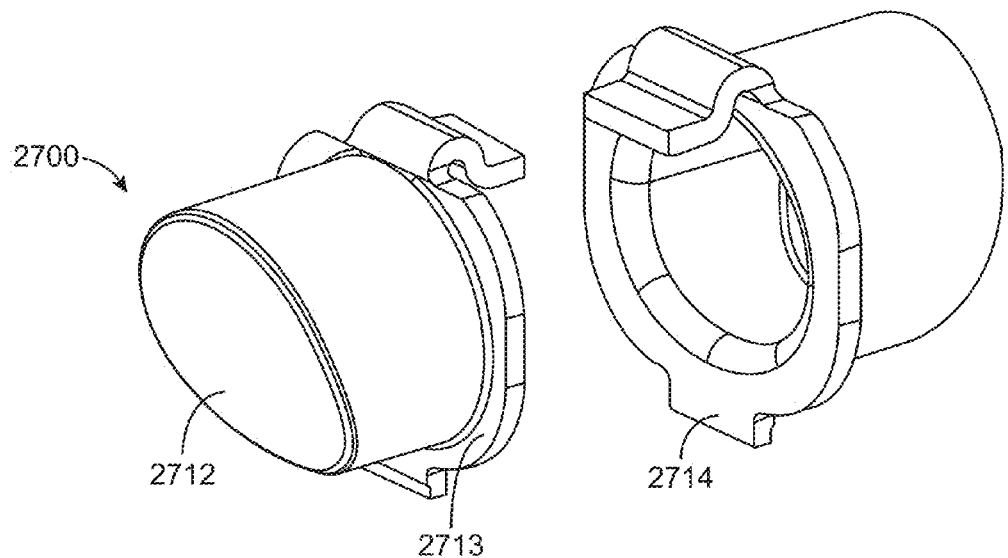
FIG. 27
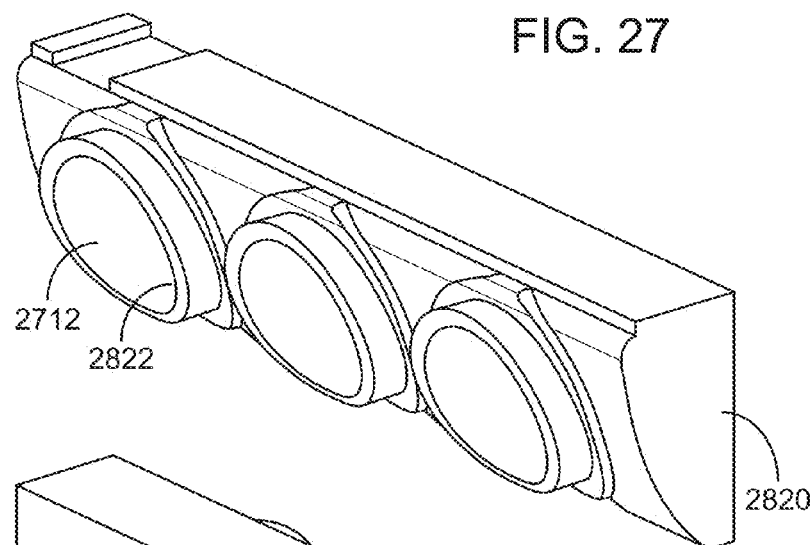
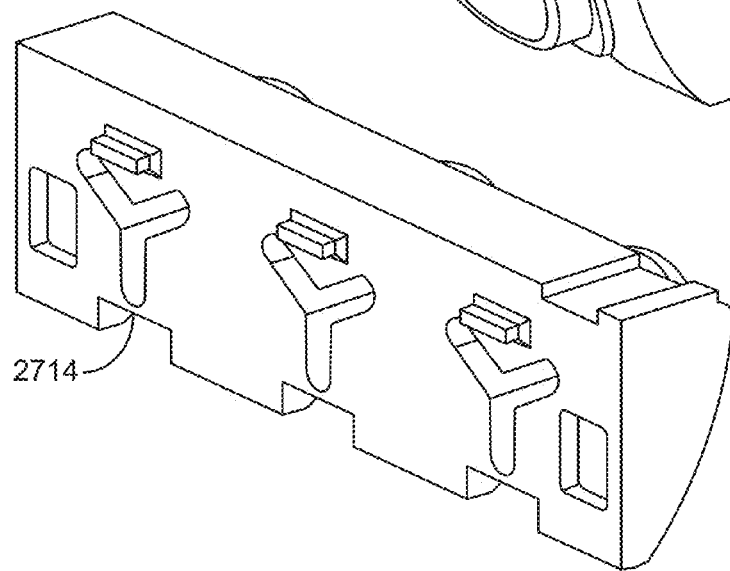
FIG. 28

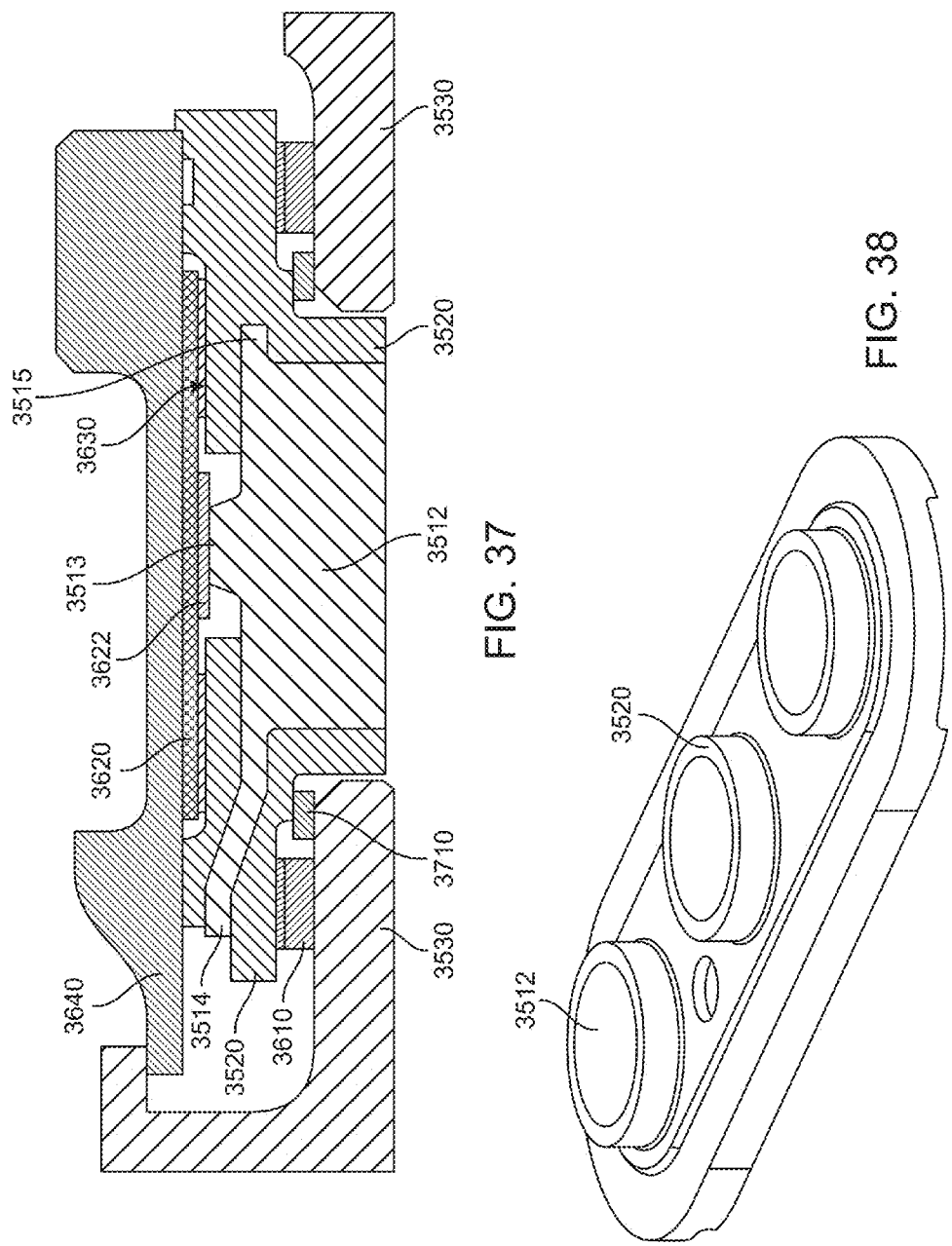

ELECTRONIC DEVICE WITH CONTACTS FLUSH WITH HOUSING

CROSS-REFERENCES TO RELATED APPLICATIONS

This application claims the benefit of priority of U.S. Provisional Patent Application 62/215,688 filed on Sep. 8, 2015; U.S. Provisional Patent Application 62/215,714 filed on Sep. 8, 2015; U.S. Provisional Patent Application 62/254,033 filed on Nov. 11, 2015; U.S. Provisional Patent Application 62/215,592 filed on Sep. 8, 2015; and U.S. Provisional Patent Application 62/214,671 filed on Sep. 4, 2015; each of which is incorporated herein by reference in its entirety.

BACKGROUND

There are many different types of electronic devices including laptop computers, tablet computers, smart phones, among others. Such devices can work in cooperation with one or more accessory devices (e.g., a keyboard, a game controller, a clock radio, etc.) to expand the capabilities and functionality of the primary or host electronic device. To do so, a connection can be established between the host electronic device and the accessory electronic device.

Connections can be established with a variety of conventional physical connectors that adhere to pre-defined formats, such as USB 2.0, USB 3.0, Firewire, and the like, or connections can be established wirelessly using protocols such as Bluetooth, WiFi, etc. In some instances, a physical, wired connection can be beneficial to exchange power and exchange data.

Wired connections require some amount of real estate within the device. As an example, a USB receptacle connector typically requires a certain amount of surface area at an exterior surface of a host device along with a certain amount of volume within the host device for the cavity of the receptacle connector into which a plug connector can be inserted and for the associated contacts and circuitry of the receptacle connector. Physical connectors can also become a potential source of corrosion and may detract somewhat from the aesthetic appearance of the device.

BRIEF SUMMARY

Embodiments of the disclosure pertain to an electronic device, such as a host electronic device, that includes a physical connector that is highly corrosion resistant, requires a small amount of real estate and is aesthetically pleasing. Some embodiments provide an external physical connector that includes contacts that are substantially flush with an exterior surface of the electronic device. The exterior surface can be flat or can be curved and an exterior surface of the contacts can include a profile that matches that of the exterior surface. In some embodiments, for example where the enclosure is made from metal or another conductive material, a nonconductive material can surround the contacts in the connector to electrically insulate each contact from the other contacts as well as from the housing of the electronic device.

In some embodiments the connector does not provide alignment by itself for mating with a corresponding connector of an accessory electronic device. Instead, an alignment feature, such as a magnet or an array of magnets, can be incorporated into the connector. The alignment feature cooperates with a corresponding alignment feature in the accessory electronic device so that the contacts in the host electronic device are properly aligned with the contacts in the accessory electronic device during a mating event so that electric signals can be passed between the two devices through the mated contacts.

In some embodiments an electronic device is provided that includes a device enclosure having an exterior surface and a contact area positioned at the exterior surface. The contact area has first and second ends and a plurality of contacts arranged between the first and second ends that are substantially flush with the exterior surface. The electronic device further includes an alignment feature within the enclosure that includes first and second magnets positioned on opposing sides of the contact area with the first magnet being positioned adjacent to the first end of the contact area and the second magnet being positioned adjacent to the second end of the contact area.

In some embodiment the portion of the device enclosure in the contact can be made from an electrically conductive material that includes one or more openings in which the plurality of contacts are positioned. One or more insulators can also be positioned in the opening surrounding the plurality of contacts and electrically isolating the plurality of contact from the device enclosure. In some embodiments the one or more insulators include a plurality of insulation rings equal in number to the plurality of contacts.

In some embodiments the exterior surface of the device enclosure and exterior surfaces of the one or more contacts and the one or more insulators can combine to form a continuous smooth surface. And, in some embodiments, there are no gaps between the exterior surface of the housing and each of the one or more insulators and there are no gaps between each of the one or more contacts and the one or more insulators. In some embodiments the device enclosure can have a curved exterior surface within the contact area and each contact in the plurality of contacts has a curvature at an outer contact surface that corresponds to a curvature of the curved exterior surface.

In some embodiments, an electronic device according to the disclosure includes: a device enclosure having an exterior surface; a contact area positioned at the exterior surface and having first and second ends, the contact area having at least one contact positioned between the first and second ends and substantially flush with the exterior surface; and an alignment feature within the enclosure comprising at least one magnet positioned within the device enclosure within or adjacent to the contact area.

In still other embodiments, an electronic device according the disclosure includes: a device enclosure that forms a cavity; a processor and a computer-readable memory positioned within the cavity; a transparent cover glass coupled to the enclosure; a display positioned within the cavity adjacent to the cover glass; and a battery positioned within the enclosure and operatively coupled to the processor and the display. The electronic device can further include a contact area positioned at an exterior surface of the device enclosure, the contact area having first and second ends. A plurality of circular contacts can be spaced apart from each other in a single row between the first and second ends with each of the plurality of circular contacts being positioned within an opening formed through device enclosure and having an exterior surface that is flush with, or recessed less than one millimeter from, an exterior surface of the device enclosure in the contact area. An insulating ring can be positioned in each of the plurality of openings that surrounds the contact in the opening and isolates the contact from the device enclosure where the exterior surface of the housing and exterior surfaces of the plurality of circular contacts and the exterior surface of the plurality of insulator rings can combine to form a continuous smooth surface. The electronic device can further include an alignment feature within the enclosure that includes first and second arrays of magnets positioned on opposing sides of the contact area with the first array of magnets positioned adjacent to the first end of the contact area and the second array of magnets positioned adjacent to the second end of the contact area.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

FIG. 27 illustrates a contact according to another embodiment of the present disclosure;

FIG. 28 illustrates contacts of FIG. 27 in a plastic insulator according to an embodiment of the present disclosure;

FIG. 37 illustrates a cutaway side view of another individual contact that can be incorporated into the contact structure of FIG. 35 according to an embodiment of the disclosure;

FIG. 38 illustrates a portion of a contact structure according to an embodiment of the disclosure;

Those skilled in the art will appreciate and understand that, according to common practice, various features of the drawings listed above and discussed below are not necessarily drawn to scale, and that dimensions of various features and elements of the drawings may be expanded or reduced to more clearly illustrate the embodiments of the present disclosure described herein.

DETAILED DESCRIPTION

Reference will now be made in detail to representative embodiments of the disclosure illustrated in the accompanying drawings. Although these embodiments are described in sufficient detail to enable one skilled in the art to practice the described embodiments, it is understood that these examples are not limiting. To the contrary, the present disclosure is intended to cover alternatives, modifications, and equivalents as can be included within the spirit and scope of the described embodiments. It is to be understood that other embodiments may be used, and changes may be made without departing from the spirit and scope of the described embodiments.

The following disclosure relates to a host electronic device suitable for use with an accessory electronic device. The host electronic device can include a physical connector that is highly resistant to corrosion, requires a small amount of real estate and is aesthetically pleasing. In some embodiments the host electronic device can include an external physical connector having one or more contacts that are flush with, or slightly recessed from, an exterior surface of the host electronic device. The exterior surface can be flat or can be curved and an exterior surface of the contacts can include a profile that matches that of the exterior surface. In some embodiments, for example where the enclosure is made from metal or another conductive material, a nonconductive material can surround the contacts in the connector to electrically insulate each contact from the other contacts as well as from the housing of the electronic device.

Figure 1:
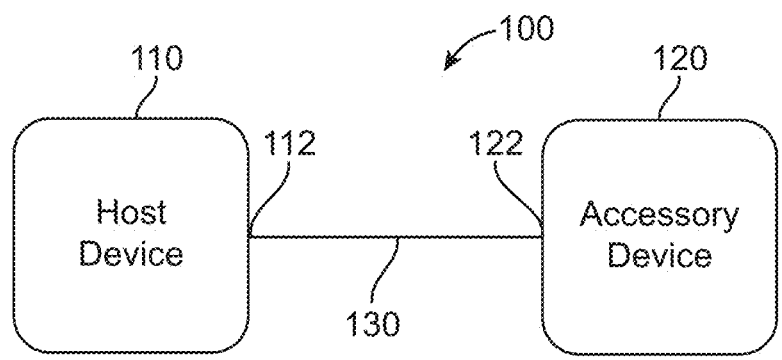
FIG. 1 illustrates an electronic system according to an embodiment of the disclosure.

FIG. 1 illustrates an electronic system 100 according to some embodiments of the present disclosure. System 100 includes a host electronic device 110 that can be connected to an accessory electronic device 120 in order to share data, power, or both between the accessory and the host. Specifically, one or more contacts 112 on host device 110 can be electrically connected to one or more contacts 122 on accessory device 120 by, for example, a cable connector 130. In other embodiments of the present disclosure, contacts 112 on host device 110 can be directly and electrically connected to contacts 122 on accessory device 120 using connectors different than cable connector 130. In still other embodiments of the present disclosure, one or more optical contacts supporting one or more optical connections between host device 110 and accessory device 120 can be included.

To facilitate a direct connection between contacts 112 on host electronic device 110 and contacts 122 on accessory electronic device 120, contacts 112 can be part of a surface mount connector incorporated into the host device 110 in which the contacts are located at an external surface of device 110 and are either flush with, or recessed a limited amount relative to, an enclosure of device 110. Some examples of a surface mount connector that includes contacts 112 are shown in the following figures and discussed below.

Figure 2:
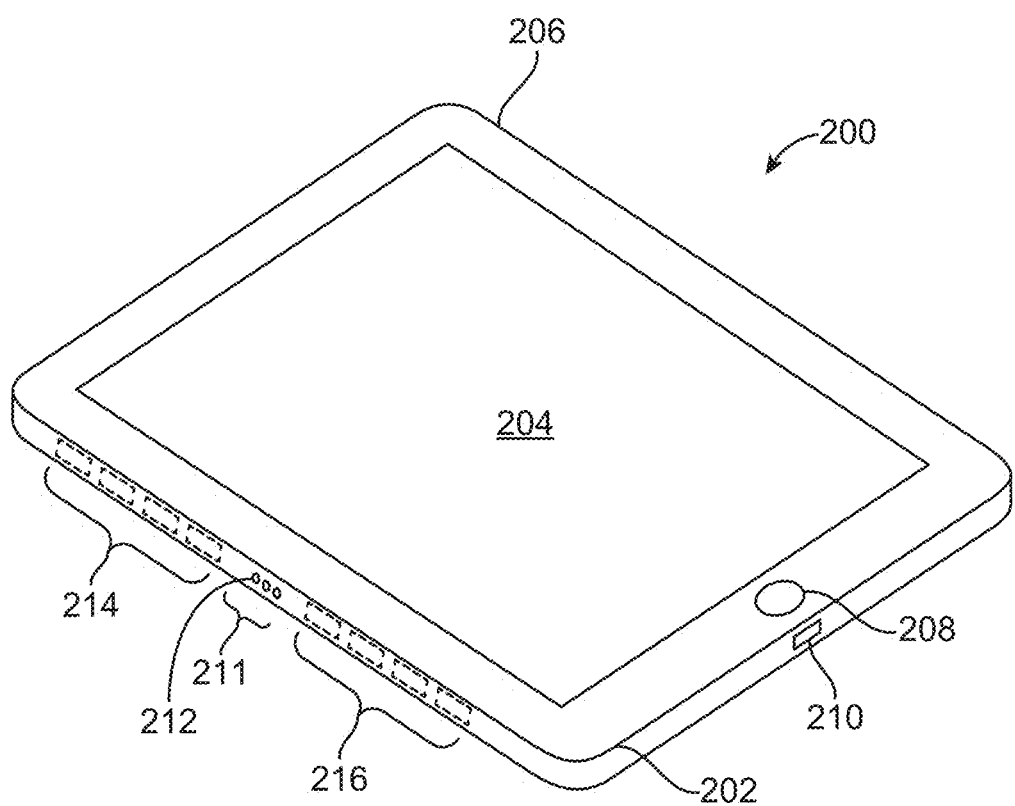
FIG. 2 is a simplified isometric view of a host electronic device shown in FIG. 1 according to some embodiments of the disclosure.

FIG. 2 illustrates an isometric view of an electronic device 200 according to some embodiments of the present disclosure. Electronic device 200 is representative of one the many different types of electronic devices that can be host electronic device 110 shown in FIG. 1. In some embodiments, electronic device 200 is a mobile communications device, such as a smartphone. In the embodiment shown in FIG. 2, electronic device 200 is a tablet computing device. Electronic device 200 can vary in shape and size. Also, electronic device 200 can include an enclosure 202 that forms a cavity and is designed to enclose and protect various internal components of device 200 within the cavity, such as a battery, one or more processors, one or more computer-readable memories, wireless interfaces, etc. In some embodiments, enclosure 202 is formed from a metal, such as aluminum, or another electrically conductive material.

Electronic device 200 can also include a display assembly 204 designed to present visual content. In some embodiments, display assembly 204 includes a touch sensitive layer designed to receive a touch input and generate commands, in accordance with the touch input, to the electronic device 200. Further, in some embodiments, display assembly 204 includes a capacitive touch sensitive layer designed to generate an input based upon a capacitive coupling with the display assembly 204. An outer protective layer 206 made from a transparent material, can overlay display assembly 204 and be attached to enclosure 202 with an adhesive or other means thereby covering the display and the cavity formed by the enclosure. Outer protective layer 206 can be made from glass or similar materials and is sometimes referred to as a cover glass. In some embodiments, electronic device 200 can further include a force detection sensor (not shown) designed to detect an amount of force applied to display assembly 204 and/or outer protective layer 206.

Electronic device 200 can include one or more input buttons, such as button 208, designed to receive an input corresponding to a command to the electronic device (for example, to change the visual content shown on display assembly 204). Further, in some embodiments, electronic device 200 includes a receptacle connector 210 designed to receive power and/or data from another device. For example, power from a power source (not shown) can be supplied to device 200 through connector 210 in order to power internal components of electronic device 200 and/or power one or more power sources (not shown) disposed in electronic device 200. Receptacle connector 210 can include a cavity in which the contacts of the receptacle connector are located.

Separate from connector 210, electronic device 200 can further include one or more electrical contacts 212 within a contact area 211 located at an exterior surface of device 200. Electrical contacts are designed to electrically couple with corresponding contacts associated with an accessory device, such as accessory device 500 (shown in FIG. 5). Contacts 212 can allow for electrical communication between electronic device 200 and accessory device 500 just as contacts 112 can allow electrical communication between devices 110 and 120. For example, in some embodiments contacts 212 can include one or more data contacts that enable the exchange of data between devices 200 and 500. Contacts 212 can also include one or more power contacts that enable an accessory device to provide power to electronic device 200 or enable an accessory device to draw power from device 200 and/or ground contacts.

Contacts 212 can be substantially flush with an exterior surface of housing 202. That is, in some embodiments contacts 212 are not formed within an exposed opening or other type of cavity in housing 202 that is typically required by a receptacle connector, such as connector 210, and that might otherwise be a source for dust or other debris to collect. Instead, contacts 212 are part of a continuous exterior surface of the device housing 202 making the contacts less noticeable than when standard connectors are incorporated into housing 202, which can be beneficial to the aesthetic appearance of electronic device 200. As used herein, contacts 212 can be said to be "substantially flush" with an exterior surface of housing 202 when the exterior surface of the contacts is flush with (e.g., in the same plane as) the surrounding housing surface as well as when an exterior surface of each individual contact 212 is recessed a limited amount, such as 1 millimeter or less, from the surface of the exterior housing 202 that surrounds the contact. In other embodiments contacts 212 are recessed 0.5 mm or less and in still other embodiments, contacts 212 are recessed 0.25 mm or less from the surrounding exterior housing surface. When the contacts are substantially flush with the surrounding exterior surface of housing 202, the contact and exterior housing can combine such that there is a continuous smooth transition between the portion of the housing exterior surface surrounding the contact and the exterior surface of the contact.

Since contacts 212 are not positioned within a cavity of housing 202 or other exposed opening of housing 202 that can provide alignment for a corresponding connector to mate and electrically connect to contacts 212, in some embodiments electronic device 200 includes an alignment feature to facilitate connector mating. In some particular embodiments, the alignment feature can include a first array 214 of alignment magnets and a second array 216 of alignment magnets disposed along a sidewall of enclosure 202 on opposite sides of contacts area 211. Each of first array 214 and second array 216 of magnets can include several magnets having a magnetic polarity arrangement to magnetically couple the arrays with corresponding arrays of magnets in the accessory electronic device as explained below. The magnetic circuits formed by multiple magnetic couplings can allow electronic device 200 to magnetically couple with an accessory electronic device, such as accessory device 500 shown in FIG. 5, and align contacts 212 with contacts of the accessory electronic device. In other embodiments, the alignment feature can include fewer or more magnets or magnetic components or other types of alignments structures.

Figure 3:
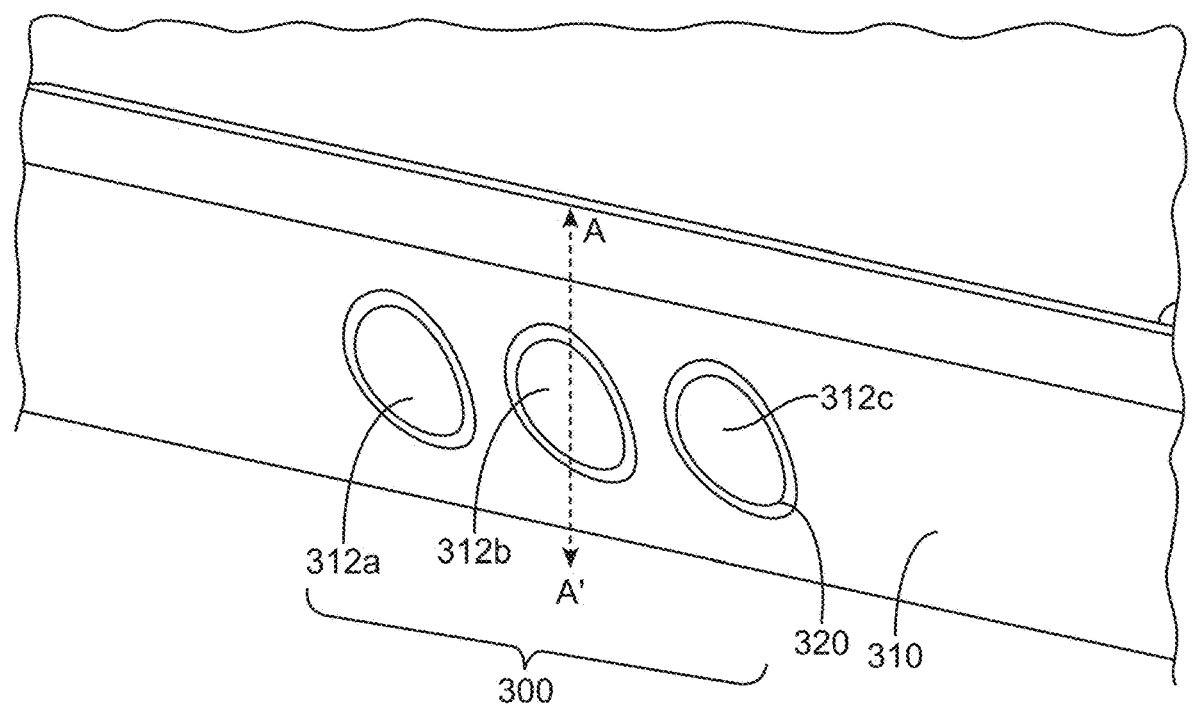
FIG. 3 illustrates a contact structure in a device enclosure according to some embodiments of the disclosure.

FIG. 3 illustrates a contact area 300 in a device enclosure according to an embodiment of the present disclosure. Contact area 300 can be, for example, contact area 211 shown in FIG. 2. In this example, contact area 300 includes three individual contacts 312 (labeled as contacts 312a, 312b and 312c) each of which is located at and substantially flush with a surrounding exterior surface of a device enclosure 310. Embodiments of the disclosure are not limited to any particular number of contacts, however, and other embodiments can include fewer or more than three contacts within contact area 300. Each of contacts 312 can be similar to or identical to contacts 212 while device enclosure 310 can be, for example, housing 202 of electronic device 200. In some embodiments device enclosure 310 can be made from a metal or similar electrically conductive material in which case an insulating ring 320 can surround an outside edge of each individual contact 312 between each contact 312 and device enclosure 310. The insulating rings 320 can be made from plastic or another nonconductive material and can electrically isolate contacts 312 from device enclosure 310. In these and other embodiments of the present disclosure, contacts 312 and insulating rings 320 can be substantially flush with a surrounding surface of device enclosure 310. These surfaces can be curved, they can be substantially flat, or they can have other contours. In some embodiments the exterior surfaces of contacts 312 and surrounding insulating rings 320 can combine such that, when the contacts and insulating ring are recessed by the limited amount, the exterior surfaces of the contact, insulating ring and device housing all combine to form a continuous smooth exterior surface that can be slightly recessed in the areas of the contact and/or insulating ring, forming three side-by-side dimples in the contact area, as shown in FIG. 3.

Figure 4:
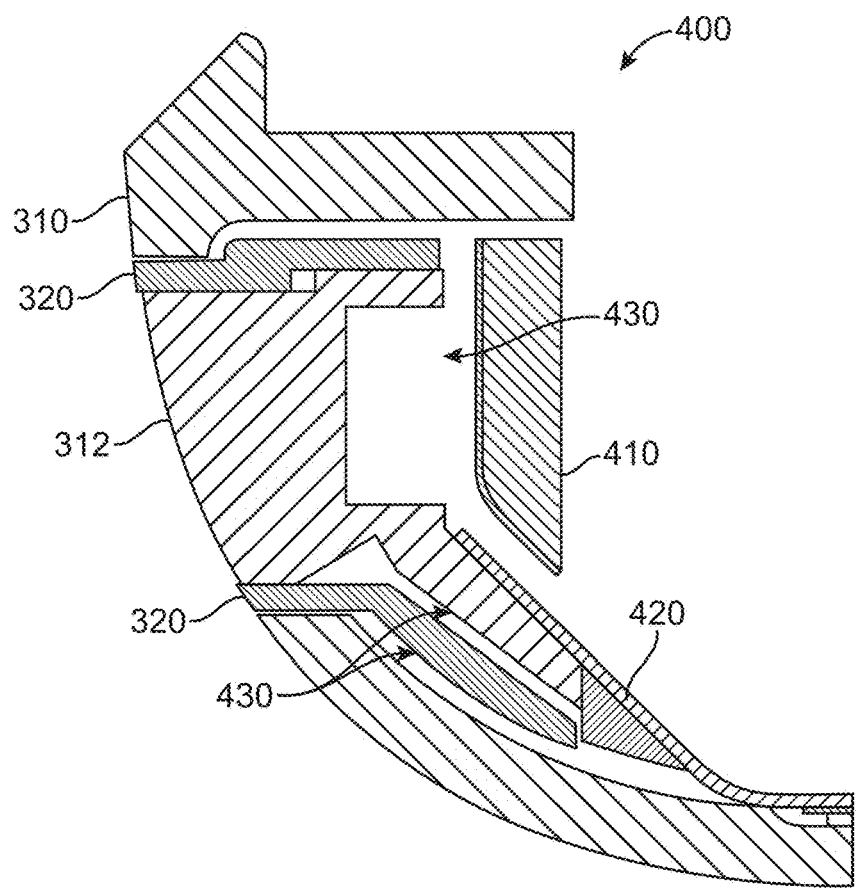
FIG. 4 is a simplified cross-sectional view of an individual contact within the contact structure shown in FIG. 3 taken along line A'A' according to some embodiments of the disclosure.

FIG. 4 illustrates a cutaway side view of a portion of contact area 300 along lines A-A' in FIG. 3. In this example, a contact structure 400 is illustrated. Contact structure 400 includes an individual contact 312 (e.g., one of contacts 312a-312c) positioned in and filling an opening in device enclosure 310. Plastic insulating ring 320 is located between contact 312 and device enclosure 310 surrounding the contact. Plastic ring 320 closely abuts both device enclosure 310 and contact 312 such that no gaps are formed between the three components. Further, as evident from FIG. 4, the exterior surface of contact structure 400 is essentially a continuous, smooth (to a user's touch) and curved surface from the portion of enclosure 310 at the top of the figure, to the upper portion of insulating ring 320, to contact 312, to the lower portion of insulating ring 320, and to the portion of enclosure 310 at the bottom of the figure.

As also shown in FIG. 4, a flexible circuit board 420 can connect to contact 312, and a bracket 410 can be used to secure contact 312 in place in device enclosure 310. In various embodiments of the present disclosure, various adhesives can be used to secure these structures in place. Specifically, adhesive layers 430 can be used to secure contact 312 to plastic insulator 320. Adhesive layers 430 can also be used to secure plastic insulator 320 to device enclosure 310. Also, adhesive layers 430 can be used to secure bracket 410 in place in device enclosure 310.

Figure 5:
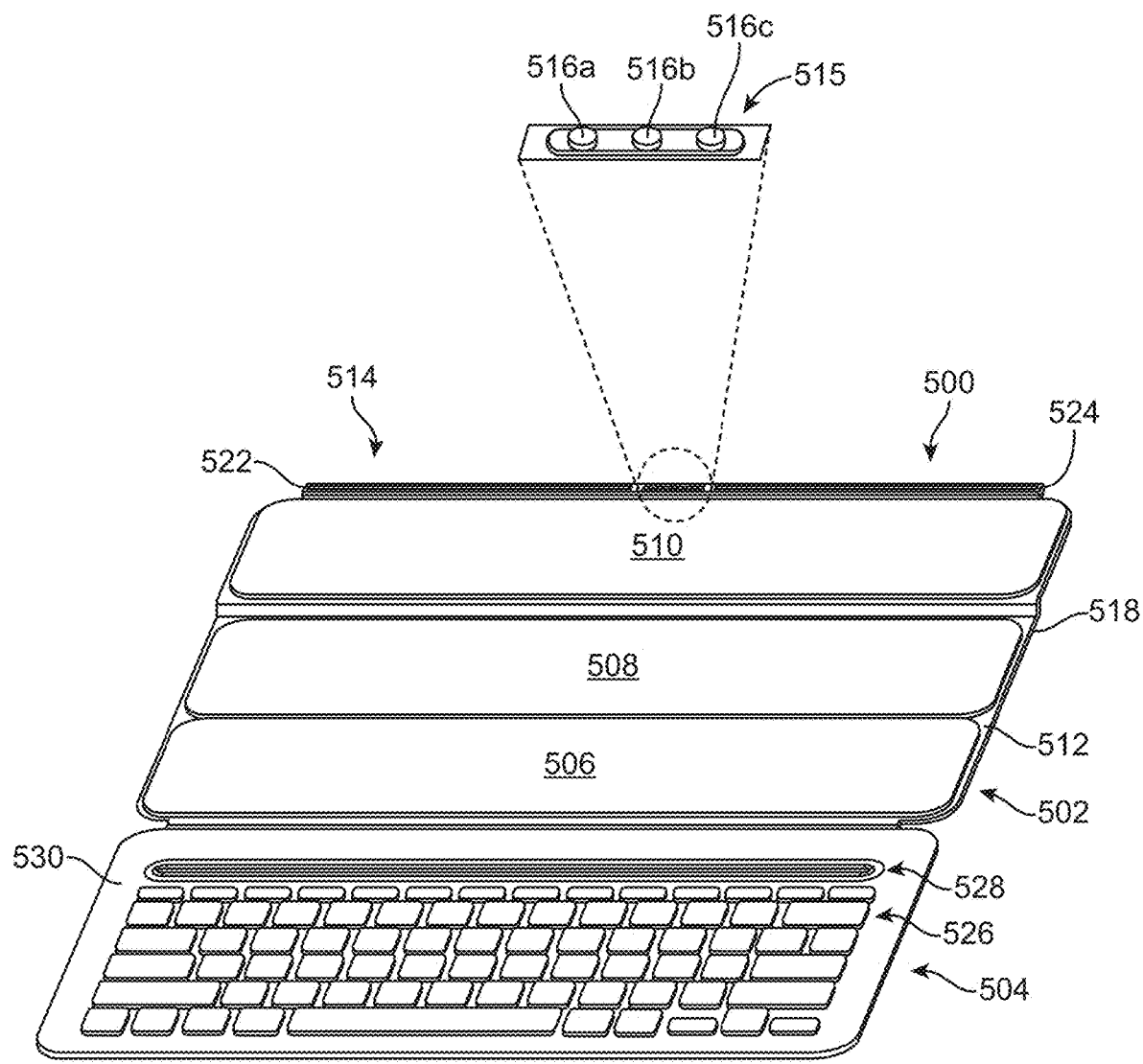
FIG. 5 is a simplified isometric view of an accessory electronic device having a keyboard attached to a cover that includes multiple contacts that can mate with the contact structure shown in FIGS. 3 and 4 according to some embodiments of the disclosure.

Further details of contact structure 400 as well as examples of contacts and contact structures that can be incorporated into a host electronic device instead of contact structure 400 according to embodiments of the disclosure are discussed below with respect to FIGS. 14-52. Before turning to those additional details and examples, however, reference is made to FIG. 5, which illustrates an isometric view of an embodiment of an electronic device that is representative of accessory electronic device 120 shown in FIG. 1. As such, electronic device 500 can be connected to a host electronic, such as host electronic device 110 shown in FIG. 1 or host electronic device 200 shown in FIG. 2. Accessory device 500 includes a cover 502 coupled with a keyboard assembly 504. Cover 502 can be sized and shaped to overlay and cover an electronic device, such as device 110 or device 200, that can be used with accessory device 500. In some embodiments, cover 502 includes multiple sections, which can also be referred to as panels or segments. For example, as shown in FIG. 5, cover 502 can include a first segment 506, a second segment 508, and a third segment 510. Each of first segment 506, second segment 508, and third segment 510 can be moveable or rotatable with respect to the remaining segment. In this regard, cover 502 may be referred to as a foldable cover. Further, as shown in FIG. 5, third segment 510 can be raised or elevated with respect to first segment 506 and second segment 508 such that when the keyboard assembly 504 is folded over and onto first segment 506 and second segment 508, keyboard assembly 504 is generally co-planar, or flush, with respect to third segment 510.

Each of the first, second and third segments can be covered or overlaid by a fabric layer 512, such as a microfiber, or generally any material that provides a cosmetic enhancement while also not causing damage to a display assembly (e.g., display 204 shown in FIG. 2) of the host electronic device that accessory keyboard 500 is designed to operate with. Also, each of the segments can include a rigid panel formed from a material, such as glass fiber, disposed below fabric layer 512. Further, the segments previously described can be folded to define a folded configuration of cover 502 in which the electronic device that the accessory keyboard is designed to cooperate with can be positioned in a propped-up position.

Cover 502 can further include an attachment feature 514 designed to receive and secure a host electronic device, such host electronic device 110 or host electronic device 200, with accessory device 500. Attachment feature 514 can include several magnets, or arrays of magnets, (not shown in FIG. 5) that can be aligned to magnetically couple to several magnets disposed in the host electronic device to accessory device 500 is to be attached. Further, accessory device 500 can include one or more electrical contacts within an accessory contact structure 515 designed to electrically couple with electrical contacts 312 of a host electronic device, such as host device 110 or 200. Generally the number of electrical contacts in contact structure 515 will equal the number of contacts in the corresponding contact area 300 that accessory 500 is manufactured to be paired with. In some embodiments, for example as shown in FIG. 5, accessory contact structure 515 includes three contacts 516a, 516b, 516c that align with and can be electrically coupled to contacts 312a, 312b, 312c, respectively. Embodiments of the disclosure are not limited to any particular number of contacts within accessory contact structure 515, however, and can include more or fewer than three contacts in various embodiments. Further details of accessory contact structure 515 are discussed later in this application with respect to at least FIGS. 6 and 7.

Attachment feature 514 can be coupled with cover 502 by way of an exterior layer 518, or outer layer, that extends along an exterior surface of cover 502 and wraps around the attachment feature 514 to define a top, or upper, surface of attachment feature 514. In some embodiments, exterior layer 518 includes a polymer-based, low modulus elastomeric material that allows some flexibility of attachment feature 514 and cover 502. Further, exterior layer 518 can include a mixture of polyurethane and coal tar and can come in a variety of colors. Also, the material forming exterior layer 518 can further include relatively high adhesion to other components and can further be abrasion-resistant. In this regard, exterior layer 518 can include a relatively high coefficient of friction, which can limit movement of the electronic device when engaged with attachment feature 514. In order to lower the coefficient of friction, attachment feature 514 can include a first layer 522 and a second layer 524 surrounding the electrical contact. First layer 522 and second layer 524 can include a lower coefficient of friction relative to attachment feature 514, which can facilitate alignment and coupling between an electronic device and attachment feature 514.

Keyboard assembly 504 can include keys 526 disposed according to a QWERTY configuration commonly known in the art for a keyboard. However, in other embodiments, the keys 526 can include a different configuration according to a language or dialect. Keyboard assembly 504 can include a printed circuit board (not shown) that receives the keys 526. Keyboard assembly 504 can further include a retention feature 528 disposed across, and protruding from, a top surface 530 of the keyboard assembly 504. Retention feature 528 can be designed to receive attachment feature 514, or at least a portion of attachment feature 514, when cover 502 is in a particular folded configuration. Retention feature 528 can provide a mechanical stop for attachment feature 514 and an electronic device secured with attachment feature 514.

As shown in FIG. 5, retention feature 528 includes a ring-like configuration protruding from a top surface 530. However, in other embodiments, retention feature 528 includes two or more discontinuous features that provide the mechanical stop previously described. Still, in other embodiments, top surface 530 include a trough or "valley" in a location within retention feature 528 that positions a portion of attachment feature 514 below top surface 530. Also, retention feature 528 can include an array of magnets designed to magnetically couple with magnets in attachment feature 514 that combines with the mechanical stop to further limit movement of attachment feature 514. Further details of attachment feature 514 are discussed below with respect to FIGS. 8-9.

Figure 6:
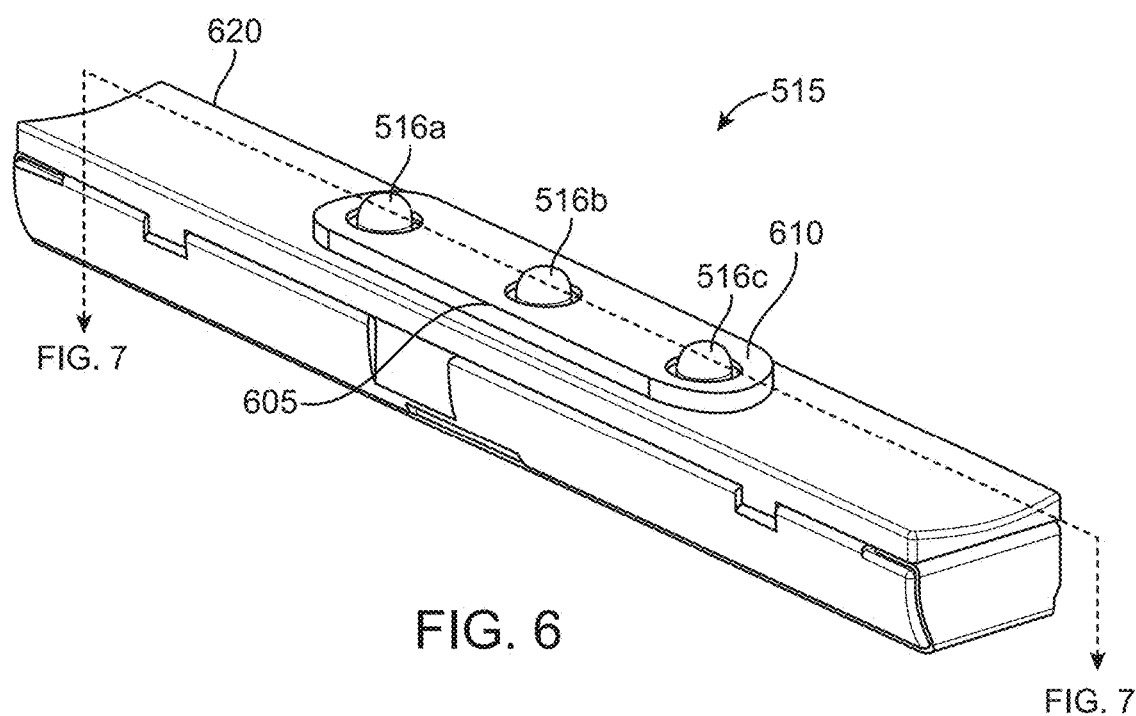
FIG. 6 is a simplified perspective view of a contact structure according to some embodiments of the disclosure.

Reference is now made to FIG. 6, which is a simplified perspective view of accessory contact structure 515 according to some embodiments of the disclosure. As shown in FIG. 6, contact structure 515 can include a contact housing 605 (also shown in FIG. 7) that includes a raised portion 610. The raised portion 610 can be positioned within and extend through an opening in a device enclosure, such as enclosure 620 shown in FIG. 7, which can be part of the housing of the accessory device or can be, for example, an exterior surface of attachment feature 514. Accessory contact structure 515 also includes three individual contacts 516a, 516b and 516c, each of which can be made from metal or another conductive material. The raised portion 610 of the contact structure can include separate openings for each of the individual contacts 516a, 516b and 516c.

Contacts 516a-516c can be low-profile contacts that allow contact structure 515 to provide contacts for a connector without consuming a large volume in the electronic device housed by enclosure 620. In various embodiments, contacts 516a-516c can be spring-biased contacts. For example, contacts 516a-516c can be biased by a spring, flexible arm, or other flexible structure such that they can be pushed or depressed and may return to their original position once released. Spring-biased contacts can provide an amount of compliance with contacts in a corresponding connector, thereby assisting in forming electrical connections between multiple contacts 516a-516c and corresponding contacts of a second connector on a second device, such as contacts 312a-312c of host electronic device 200.

Figure 7:
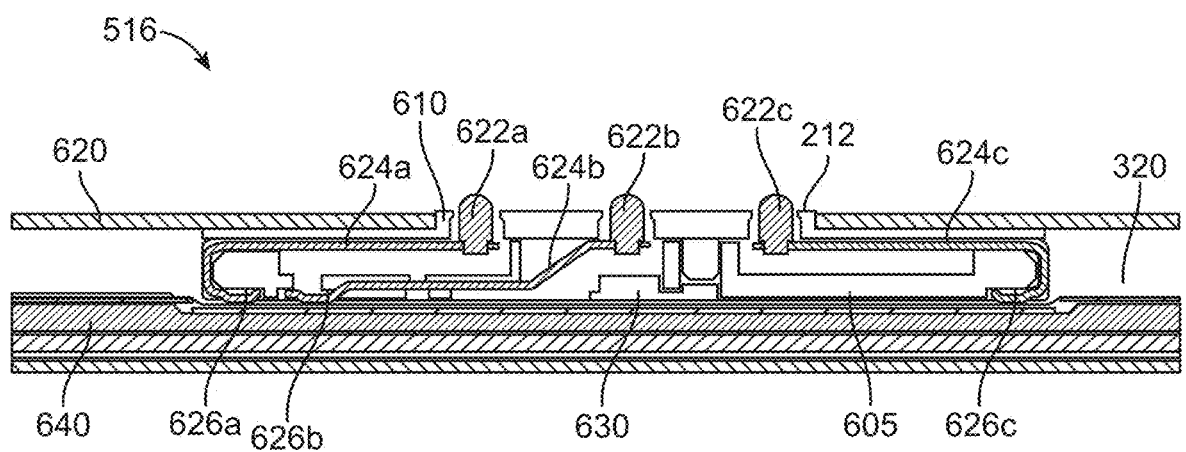
FIG. 7 is a simplified a side cross-sectional view of the contact structure shown in FIG. 6 according to some embodiments of the disclosure.

FIG. 7 is a simplified side cross-sectional view of contact structure 515 according some embodiments of the present disclosure taken along the dotted plane, shown in FIG. 6. Contact structure 515 can be located in an accessory electronic device having a housing or enclosure 620. As noted above, raised portion 610 of cover 210 of contact structure 515 can be located in an opening in device enclosure 620. Contact housing 605 of contact structure 515 can support contacts 516a, 516b, 516c (e.g., opening 548 shown in FIG. 8) having contacting portions 622a, 622b, and 622c, respectively. These contacting portions 622a-622c can be attached to ends of flexible lever arms 624a, 624b, and 624c, respectively. Each flexible arm may terminate in a second end and can include a barb, which may be inserted into notches or grooves in contact housing 605. Specifically, flexible lever arm 624a can include barb 626a, flexible lever arm 624b can include barb 626b, and flexible lever arm 624c can include barb 626c. In some embodiments, the center contact can have contact housing 605 insert molded around it and barb 626b may not be needed.

During assembly, the central contact including contact portion 622b can be inserted through an opening in a bottom of connector housing 605. Without more, contacting portion 622b could be pushed deep into connector housing 605. In some instances, contacting structure 622b could be pushed below a top surface of raised portion 610. If contacting portion 622b were to be laterally offset at this time, contacting portion 622b may not emerge from its opening in contact housing 605. Accordingly, a bottom stop portion 630 can be located under contacting portion 622b. Bottom stop portion 630 can limit a depth to which contacting portion 622b can be depressed, thereby preventing possible damage to contact structure 515. In other embodiments, the center contact can have contact housing 605 insert molded around it and bottom stop portion 630 may not be needed.

Figure 8:
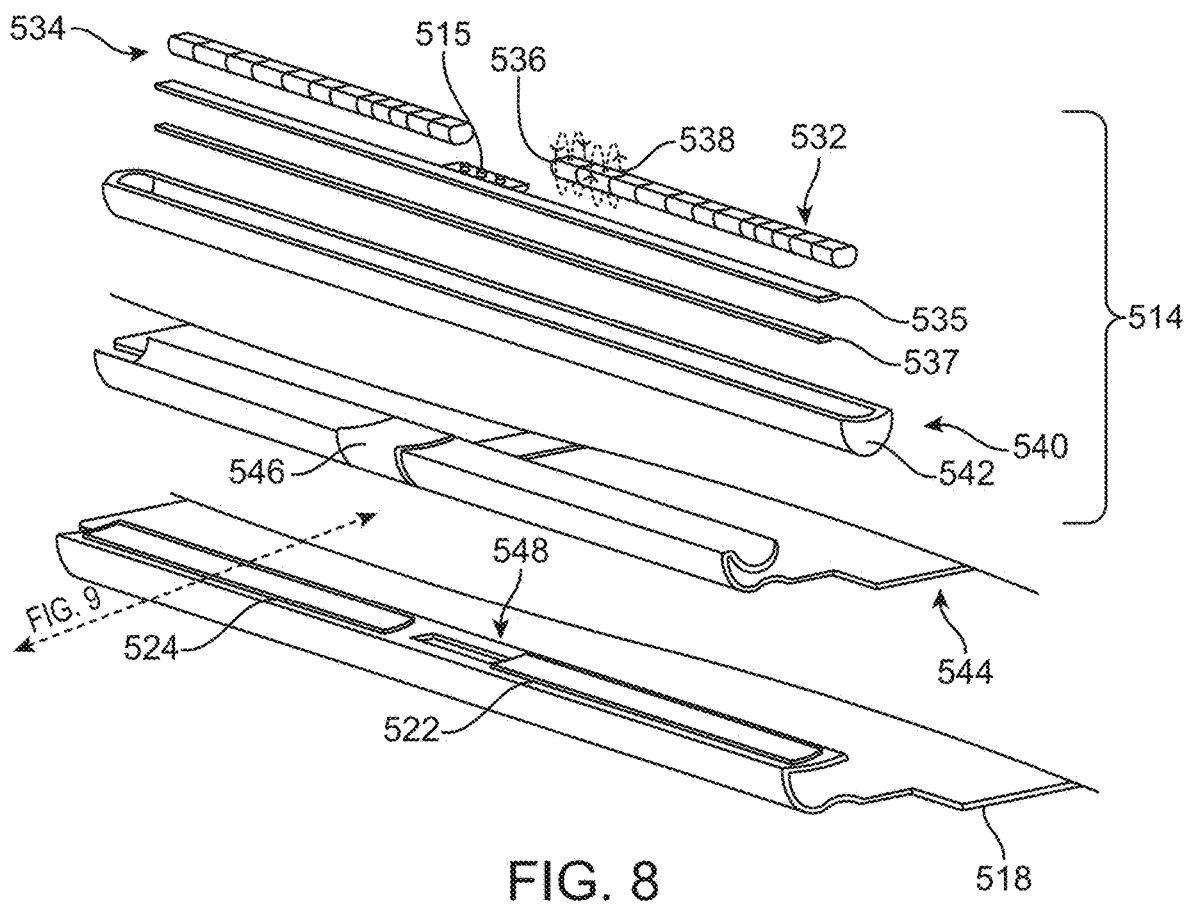
FIG. 8 illustrates an exploded view of various components of the attachment feature shown in FIG. 2 according to some embodiments of the disclosure.

Reference is now made to FIG. 8, which illustrates an exploded view of various components of attachment feature 514 according to some embodiments of the disclosure. For example, attachment feature 514 can include a first array 532 of magnets and a second array 534 of magnets. In some embodiments, first array 532 and second array 534 include several magnets (such as neodymium magnets) aligned together prior to assembly. In the embodiment shown in FIG. 8, first array 532 and second array 534 are formed form a composition of non-magnetized material and magnetized prior to an assembly of attachment feature 514. First array 532 and second array 534 can be placed under a camera/sensor assembly (not shown) and aligned with a magnetizer (not shown) according to a desired alignment between electrical contacts 516a-c and an electronic device (not shown). This allows for a custom magnetization that improves a magnetic alignment of an electronic device.

FIG. 8 further shows first array 532 and second array 534 having several magnetized regions. For example, first array 532 can include a first magnetized region 536 and a second magnetized region 538 adjacent to first magnetized region 136. Also, the magnetized regions can include dissimilar magnetic regions, or magnetic region of different sizes. As known by one of ordinary skill in the art, a magnet generally includes magnetic polarity arrangement having a "North" facing polarity, or North Pole, and a region of a "South" facing polarity, or South Pole, with magnetic field lines extending in a direction from the North Pole to the South Pole. Also, it is also understood by one of ordinary skill in the art that a North Pole of a magnet can be magnetically attracted to a South Pole of a magnet, and that two North poles, or two South poles, can magnetically repel one another. In this regard, adjacent magnetic regions of first array 532 and second array 534 can include magnet polarity arrangements designed to produce magnetic field lines in opposite directions. For example, as shown in FIG. 8, first magnetized region 536 includes magnetic field lines (shown as dotted lines) extending in a first direction, indicative of a top surface have a North polarity and a bottom surface (not shown) opposite the top surface having a South polarity. Conversely, second magnetized region 538 includes magnetic field lines (shown as dotted lines) extending in a second direction opposite the first direction, indicative of a top surface have a South polarity and a bottom surface (not shown) opposite the top surface having a North polarity. This pattern can be representative of magnetized regions of first array and the second array. Further, in other embodiments, the pattern is reversed such that first magnetized region 536 and second magnetized region 538 include magnetic field lines in the opposite direction as those shown in FIG. 8. Also, first magnetized region 536 can be smaller than that of second magnetized region 538. Similar, but complementary, magnet polarity arrangements can be employed in magnet arrays 214 and 216 of device 200 to facilitate magnet coupling of the attachment feature to device 200.

Also, as shown in FIG. 8, electrical contact structure 515 can be disposed on a flexible circuit assembly 535, and a magnetic shunt 537 can be disposed below first array 532 and second array 534. Magnetic shunt 537 can be formed from a metal, including soft steel, magnetically attracted to first array 532 and second array 534. Also, magnetic shunt 537 can alter the direction of the magnetic fields of the first and second arrays in a direction towards magnets in a host electronic device, such as magnet arrays 214 and 216 in electronic device 200, to which attachment feature secures accessory 500. Attachment feature 514 can further include a protective component 540 that include a metal layer (not shown) that can include stainless steel. An outer coating 542 can cover the metal layer and provide an aesthetic finish. In some embodiments, outer coating 542 includes a photothermolplastic ("PTP") material that includes polyurethane plus a thermoplastic.

Attachment feature 514 can further include or receive several additional features. For example, an electrically conductive fabric 544 designed to carry electrical signals from an electronic device to a connector (not shown) of keyboard assembly 504 (shown in FIG. 5), or vice versa. Electrically conductive fabric 544 can wrap around protective component 540 electrically couple with flexible circuit assembly 535, and electrically conductive fabric 544 can be electrically coupled with one or more of the individual electrical contacts 516 within contact structure 515 (i.e., one or more of contacts 516a-516c). In some embodiments, electrically conductive fabric 544 is electrically conductive throughout (the electrically conductive fabric 544). In the embodiment shown in FIG. 8, electrically conductive fabric 544 includes an electrically conductive region 546 that includes three electrically independent signal traces (not shown) that electrically couple to respective ones of contacts 516a-516c. Exterior layer 518 can also wrap around attachment feature 514 and combine with first layer 522 and second layer 524 to define a top surface of the attachment feature. As shown, exterior layer 518 can include an opening 548 that allows each individual electrical contact 516 to couple with an electrical contact of an electronic device.

Figure 9:
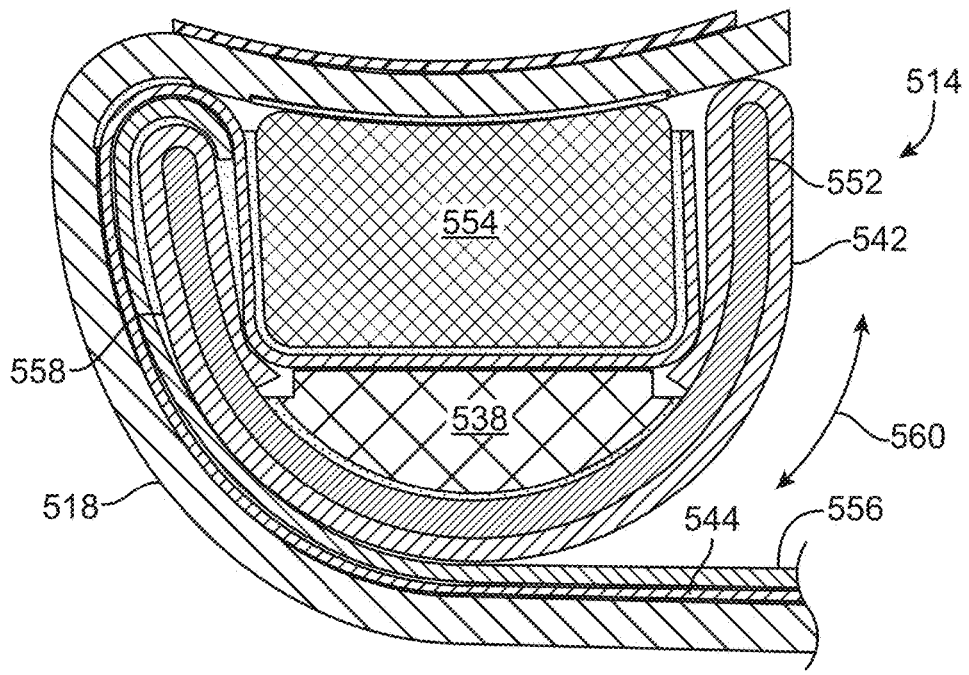
FIG. 9 illustrates a cross sectional view of the attachment feature shown in FIGS. 2 and 8 through the dashed line shown in FIG. 8.

FIG. 9 illustrates a cross-sectional view of attachment feature 514 through the dashed line shown in FIG. 8 and with the various components shown in FIG. 8 assembled together. As shown, metal layer 552, surrounded by outer coating 542, is generally U-shaped, but can vary according to a desired shape of attachment feature 514. Also, exterior layer 518 and electrically conductive fabric 544 generally wrap around protective component 540, with exterior layer 518 extending over a magnet 554 (of either first array 532 or second array 534, shown in FIG. 8) and electrically conductive fabric 544 extending below magnet 554, between magnet 554 and magnetic shunt 537. Also, electrically conductive fabric 544 can be covered by a cosmetic layer 556, which further provides a protective cover to the electrically conductive fabric 544. The cosmetic layer 556 can include PTP.

Also, cosmetic layer 556 can be adhesively secured with an upper portion of attachment feature 514. For example, an adhesive layer 558 between cosmetic layer 556 and outer coating 542 can extend only along a fraction (less than half) of outer coating 542. This allows for better ease of movement of the attachment feature in a clockwise and/or counterclockwise manner (denoted by arrow 560). Also, although not specifically shown, several features shown and described in FIG. 9 can be adhesively secured together.

Figure 10:
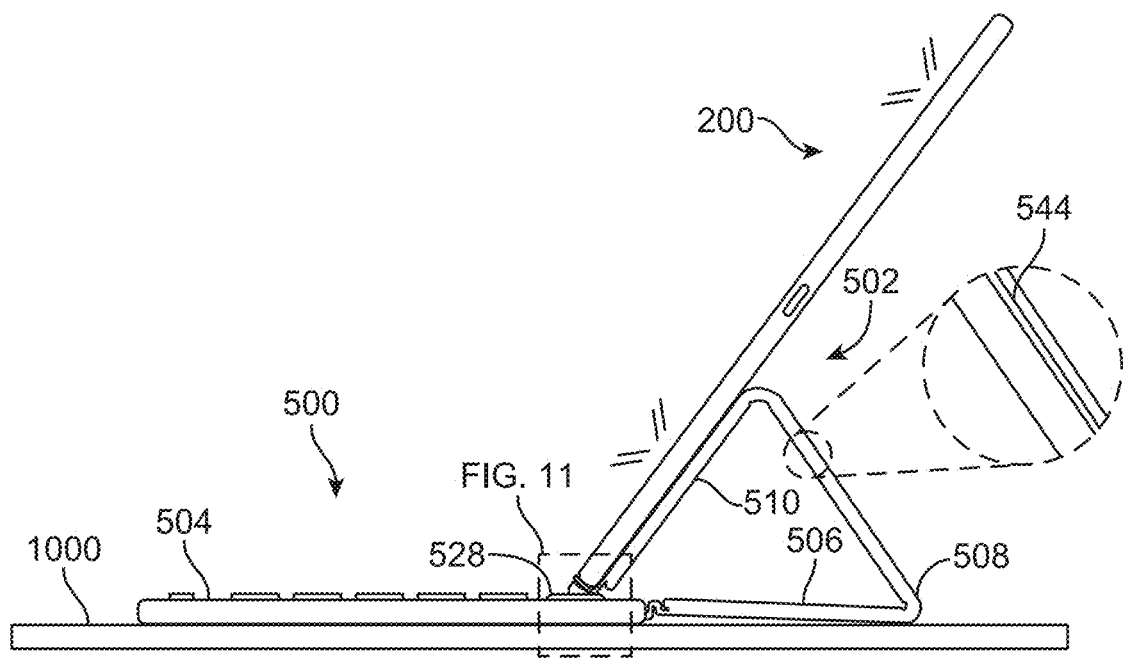
FIG. 10 illustrates a side view of the accessory device shown in FIG. 5 coupled with the electronic device shown in FIG. 2, with the accessory device in a folded configuration to allow use of the keyboard assembly with the electronic device.

Referring now to FIG. 10, which illustrates a side view of accessory device 500 resting on a surface 1000 (e.g., a desktop) and coupled with electronic device 200. As shown in FIG. 5, accessory device 500 is in a folded configuration to allow use of keyboard assembly 504 with electronic device 200. In the folded configuration, attachment feature 514 of accessory device 500 couples cover 502 to the retention feature 128 portion of keyboard assembly 504. At the same time, attachment feature 514 also couples accessory device 500 to host electronic device 200 such that contact area 300 in host device 200 is mated with and electrically connected to contact structure 515 in accessory device 500. As shown, the folded configuration can include first segment 506, second segment 508, and third segment 510 folded to form a triangular support for the electronic device 200. Further, the electronic device 200 can abut against third segment 510.

In the configuration shown in FIG. 10, keyboard assembly 504 can be used as an input device in order to generate input or command to electronic device 200 and change the visual content (denoted as several diagonal lines) of display assembly 204 (shown in FIG. 2) of electronic device 200. This is due in part to electrically conductive fabric 544, shown in the enlarged view, folding with cover 502, and extending through cover.

While not shown in FIG. 10, one or more arrays of magnets are disposed below retention feature 528 of keyboard assembly 504 and couple with the magnets in the first array 532 and second array 534 of attachment feature 514 when attachment feature 114 is positioned, or nearly positioned, in retention feature 128. In this regard, each magnet in first array 532 and second array 534 can include a magnetic polarity arrangement to magnetically couple with a magnet in one or more arrays of magnets (not shown) under retention feature 528. This allows retention feature 528 to simultaneously secure attachment feature 514 and electronic device 200 coupled with attachment feature 514. In some embodiments, the combined number of magnets in the one or more magnet arrays under retention feature 528 is equal to the combined number of magnets in first array 532 and second array 534.

Figure 11:
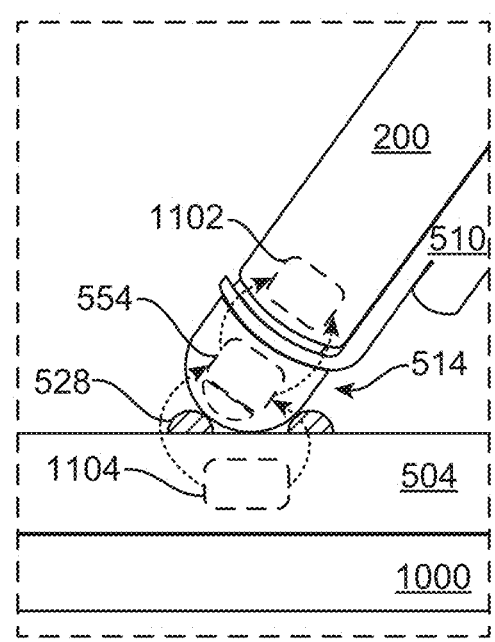
FIGS. 11-13 illustrate an enlarged view of the portion of FIG. 10 shown in dotted lines, with the attachment feature of the accessory positioned in a retention feature of the accessory.

To more clearly illustrate the magnetic coupling associated with attachment feature 514 and both retention feature 528 and electronic device 200, reference is made to FIG. 11, which illustrates an enlarged partial cross-sectional view of a portion of FIG. 10 shown in dotted lines taken through portions of attachment feature 514 and retention feature 528 that include alignment magnets as discussed. As shown in FIG. 11, attachment feature 514 is positioned in retention feature 528 and the retention feature is used as a mechanical stop for attachment feature 514. Also, as shown, attachment feature 514 can include a magnet 554 that can be part of first array 532 of magnets or second array 534 of magnets (shown in FIG. 8) magnetically coupled with a magnet 1102 that can be part of the first array 214 or the second array 216 of magnets, respectively (shown in FIG. 2). The magnetic field lines are shown as dotted lines having arrows. Magnet 554 in attachment feature 514 can further be magnetically coupled with a magnet 1104 that is part of an array of magnets in the keyboard assembly 504. This magnetic coupling can, in combination with the retention feature 528, maintain the attachment feature 514 and the electronic device 200 in a stationary position.

Figure 12:
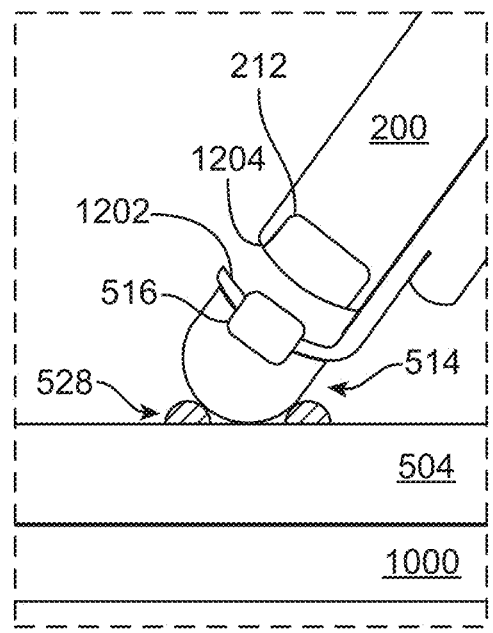
Figure 13:
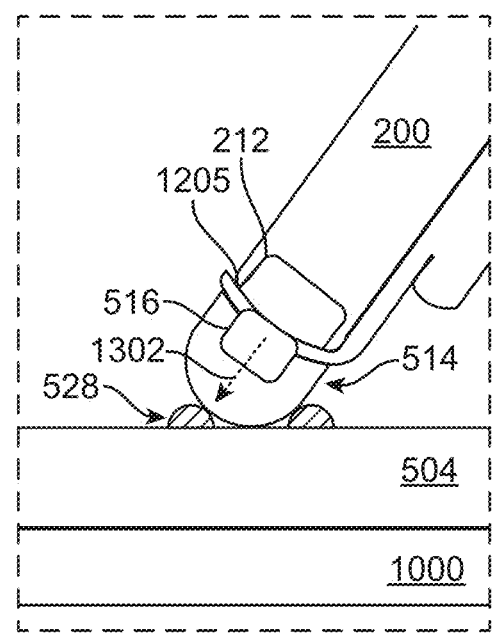

As discussed above, when accessory device is in the folded position shown in FIG. 10 such that attachment feature 514 is properly aligned with and secured within retention feature 528, each contact 516 is accessible to be electrically coupled to a respective contact 212 that is part of host device 200. This connection sequence is illustrated in FIGS. 12 and 13, each of which represents the same enlarged partial cross-sectional view of FIG. 10 that is shown in FIG. 11 but through a pair mating contacts, a contact 212 (from electronic device 200) and a contact 516 (e.g., one of contacts 516a-516c from accessory device 500) instead of through the alignment magnets. Specifically, FIG. 12 depicts host electronic device 200 in a position in which contact 212 is spaced apart from, and thus not yet mated with, contact 516. As shown in FIG. 12, contact 516 protrudes slightly above an exterior surface 1202 of attachment feature 514.

As shown in FIG. 13, as electronic device 200 is moved closer to attachment feature 514 and magnets 1102 and 554 pull device 200 into the attachment feature, contact 516 becomes physically and electrically connected to contact 212. Contact 516 is attached to a flexible lever arm (e.g., one of lever arms 624a-624c discussed with respect to FIG. 7) and is thus pushed into the enclosure 620 of the attachment feature by contact 212 (as shown by arrow 1302) until device 200 reaches its fully mated position in which exterior surface 1204 of device 200 is in physical contact with exterior surface 1202 of attachment feature 514 at an interface 1205.

Figure 14:
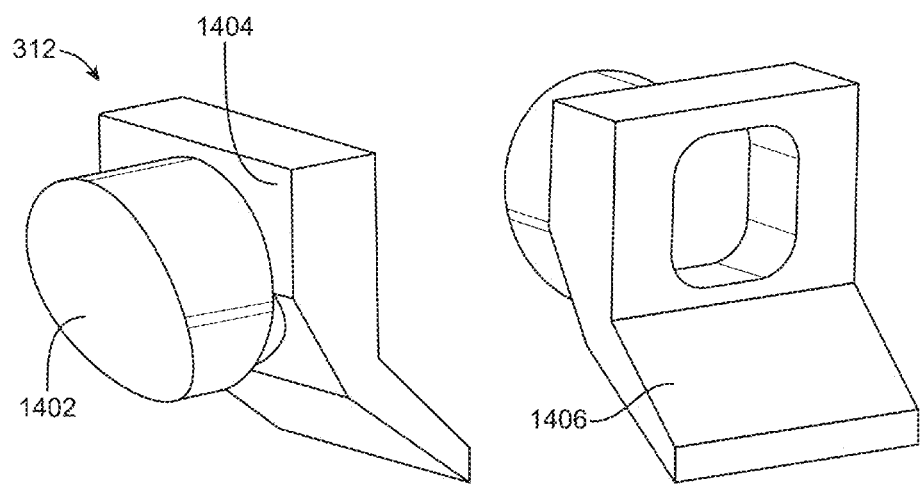
FIG. 14 illustrates the contact of FIG. 4.

Turning our attention back to details of contact 212, reference is made to FIG. 14, which illustrates an embodiment of contact 312 shown in FIG. 4 as an example of a contact 212. As shown in FIG. 14, contact 312 can include a contacting portion 1402 emerging from a front face 1404. Contact 312 can further have a rear angle portion 1406 that can connect to flexible circuit board 320. Contact 312 can be formed by machining, forging, printing, etching, stamping, or in other ways. In other embodiment of the present disclosure, contacts 312 can be formed by a deep drawn process.

Figure 15:
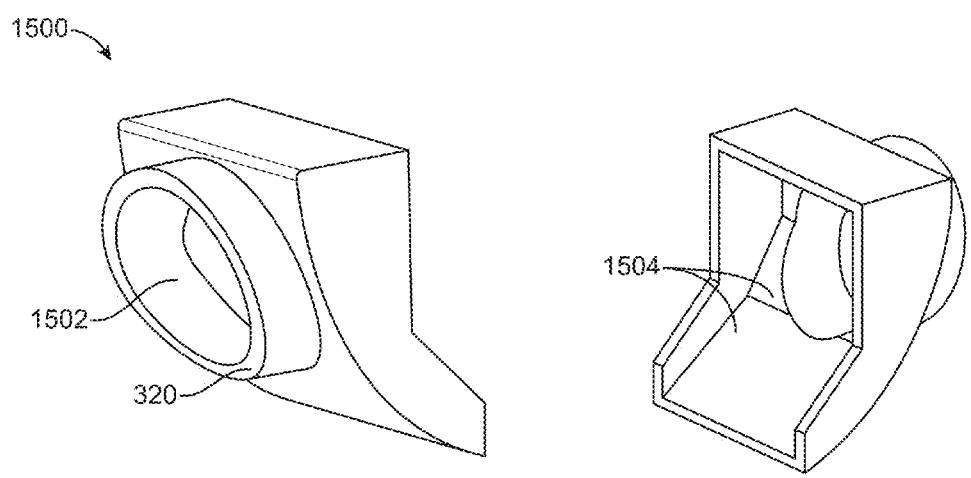
FIG. 15 illustrates a plastic insulator for the contact of FIG. 4.

FIG. 15 illustrates a plastic insulator 1500 according to an embodiment of the present disclosure. In this example, plastic insulator 1500 includes a ring 320 (also shown in FIG. 3) that define an opening 1502 for accepting contact 312. Rear surfaces 1504 can be covered with adhesives and contact 312 can be joined to plastic insulator 120 at those locations.

Figure 16:
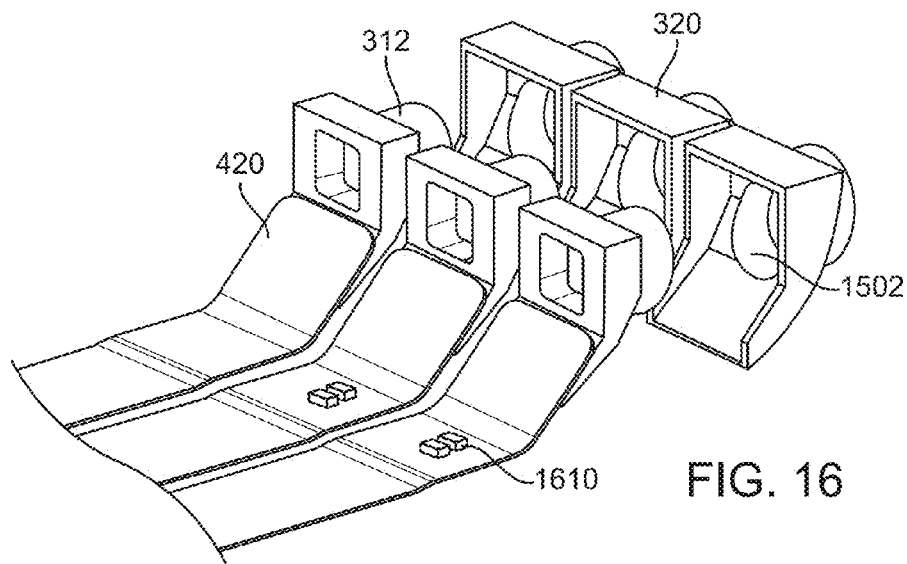
FIGS. 16-18 illustrate a method of assembling a contact structure in an electronic device according to an embodiment of the present disclosure.
Figure 17:
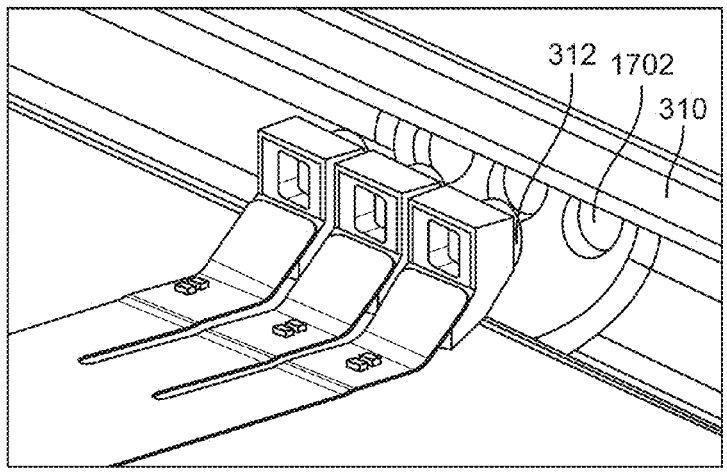
Figure 18:
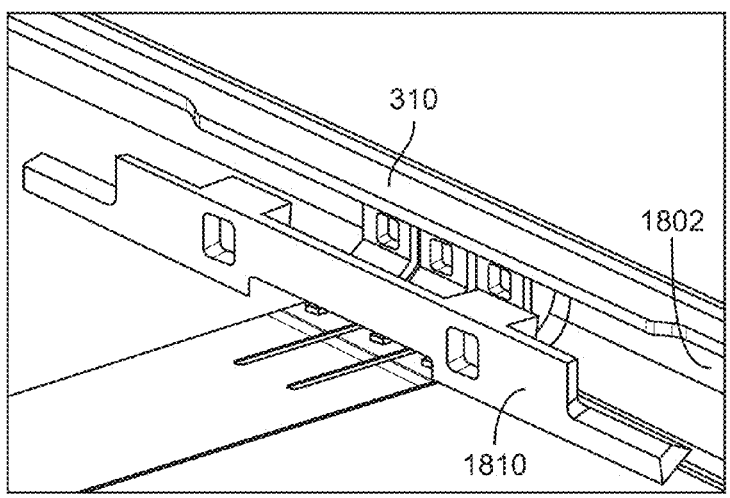

FIGS. 16-18 illustrate a method of assembling a set of contacts according to an embodiment of the present disclosure. In FIG. 16, a number of contacts 312 Can be mated to a flexible circuit board 420 according to an embodiment of the present disclosure. Contacts on flexible circuit board 420 can be attached to rear portions 1406 of contacts 312 by soldering, laser, spot, or resistance welding, or by other method. In this example, flexible circuit board 420 can have three portions, each connected to an angled portion 1406 of a contact 312. Diodes 1610 can be connected between flexible circuit board traces in flexible circuit board 420 and the device enclosure 310 (shown in FIG. 4) to provide ESD protection. In this example, flexible circuit board 420 can be split into three portions as shown to provide a greater flexibility in attaching flexible circuit board 420 to rear portions 1406 of contacts 312. Contacts 312 can be aligned with openings 1502 in plastic insulators 1500.

In FIG. 17, barrels including contacts 312 in plastic insulators 1500 (as shown in FIG. 16) can be aligned with openings 1702 in device enclosure 310. Plastic insulators 1500 can be glued in place. In FIG. 18, bracket 1810 can be glued in place in notch 1802 in device enclosure 310.

In various embodiments of the present disclosure, different portions of these contact structures and other contact structures can be formed of various materials. For example, bracket 1810 and plastic insulators 1500 can be formed of the same or different materials, such as plastic, LPS, or other non-conductive or conductive material. Contacts 312 can be formed of noncorrosive materials, such as gold, gold plated copper, gold plated nickel, gold-nickel alloy, and other materials.

In various embodiments of the present disclosure, different portions of these contact structures and other contact structures can be formed in various ways. For example, bracket 1810 and plastic insulators 1500 can be formed using injection or other molding, printing, or other technique. Contacts 312 can be machined, stamped, coined, forged, printed, or formed in different ways, such as by using a deep drawn process. Plastic insulator 1500 can be formed around contacts 312 using injection molding.

Figure 19:
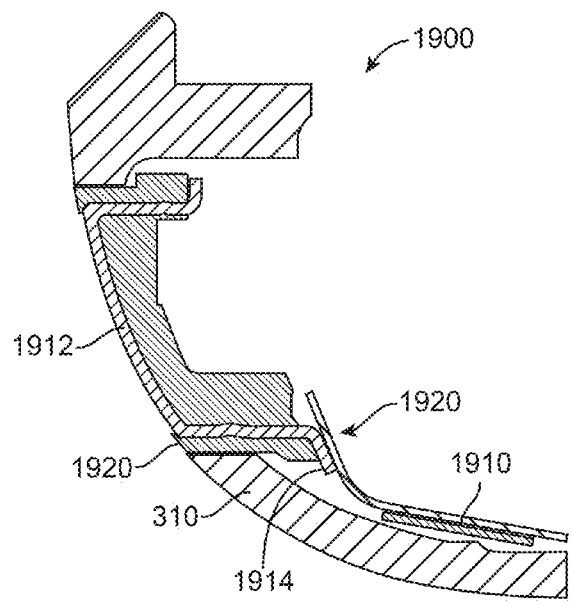
FIG. 19 is a simplified cross-sectional view of an individual contact within the contact structure shown in FIG. 3 taken along line A'-A according to another embodiment of the present disclosure.

FIG. 19 illustrates a cutaway side view of another contact structure 1900 that can be used for the contact structure of FIG. 3. In this example, a contact 1912 can be located in an opening in device enclosure 310. A plastic insulator 1920 can be located between contact 1912 and device enclosure 310 and the exterior surface of contact structure 1900 can be an essentially continuous, smooth (to a user's touch) and curved surface across the enclosure, insulating ring and contact. A flexible circuit board 1920 can connect to contact 1912 at rear portion 1914. An optional bracket (not shown) can be used to secure contacts 1912 in place in device enclosure 310, though in other embodiments of the present disclosure, contacts 1912 and insulators 1920 can be glued or otherwise fixed in place. In various embodiments of the present disclosure, various adhesives can be used to secure these structures in place. Specifically, an adhesive layer can be used to secure contact 1912 to plastic insulator 1920. Adhesive layers can also be used to secure plastic insulator 1920 to device enclosure 310. Also, adhesive layers can be used to secure an optional bracket in place in device enclosure 310. Support 1910 can provide mechanical support for flexible circuit board 1920. Support 1910 can include ESD diodes (as shown below in FIG. 22.)

Figure 20:
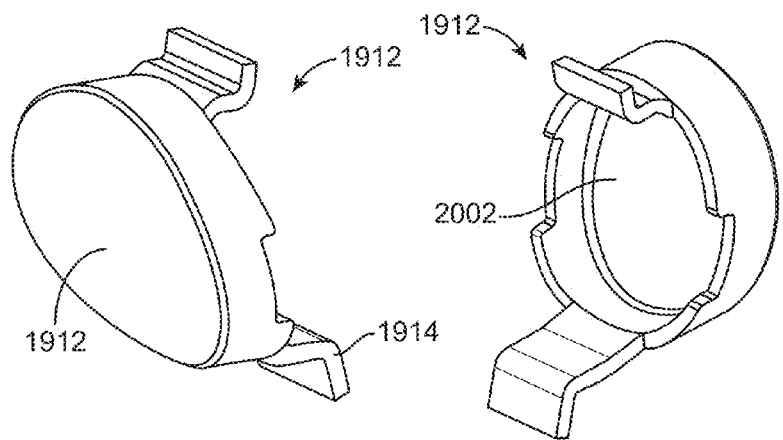
FIG. 20 illustrates the contact of FIG. 19.

FIG. 20 illustrates the contact structure of FIG. 19. In this example, a force can be applied at rear surface 2002 to form contacts 1912 in a deep drawn process. As before, contact 1912 can include a rear angle piece 1914 that can be mated with a flexible circuit board. In other embodiment of the present disclosure, contact 1912 can be formed by machining, forging, printing, etching, stamping, or in other ways.

Figure 21:
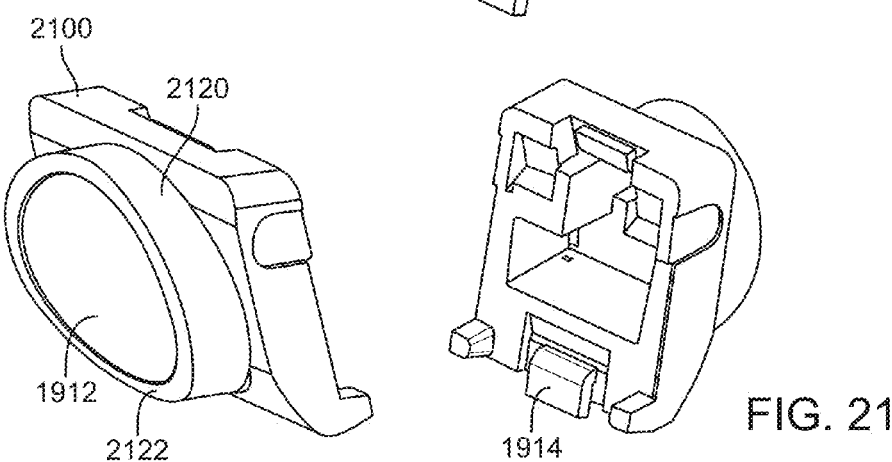
FIG. 21 illustrates the contact of FIG. 20 in a plastic insulator according to an embodiment of the present disclosure.

FIG. 21 illustrates the contact of FIG. 20 in a plastic insulator 2100 according to an embodiment of the present disclosure. In this example, plastic insulator 2100 can have openings 2122 for accepting contacts 1912. Rear contact portions 1914 can extend from ring-shaped insulator 2120.

Figure 22:
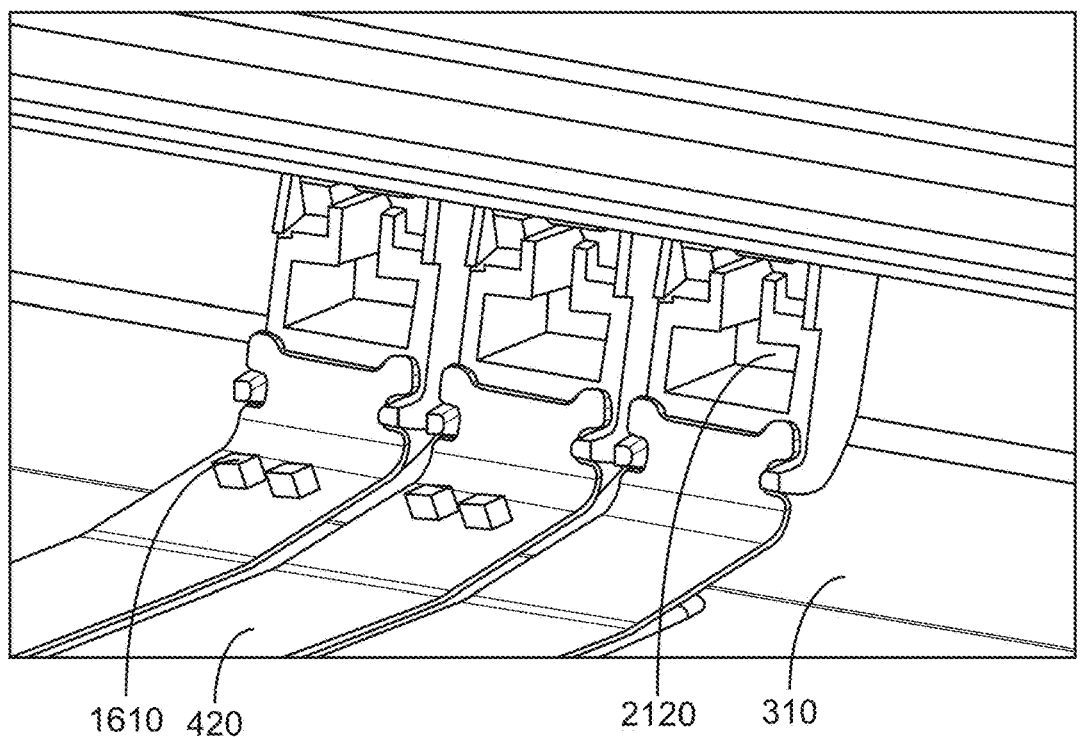
FIG. 22 illustrates an assembled contact structure in an electronic device according to an embodiment of the present disclosure.

FIG. 22 illustrates an assembled contact structure according to an embodiment of the present disclosure. A number of contacts 1912 (not shown) in insulators 2120 can be mated to flexible circuit board 420 according to an embodiment of the present disclosure. Contacts on flexible circuit board 420 can be attached to rear portions 1914 of contacts 1912 (as shown in FIG. 19) by soldering, laser, spot, or resistance welding, or by other method. In this example, flexible circuit board 420 can have three portions, each connected to a rear portion 1914 of a contact 1912. Diodes 1610 can be connected between flexible circuit board traces in flexible circuit board 420 and the device enclosure 310 to provide ESD protection. In this example, flexible circuit board 420 can be split into three portions as shown to provide a greater flexibility in attaching flexible circuit board 420 to rear portions 1914 of contacts 1912.

Figure 23:
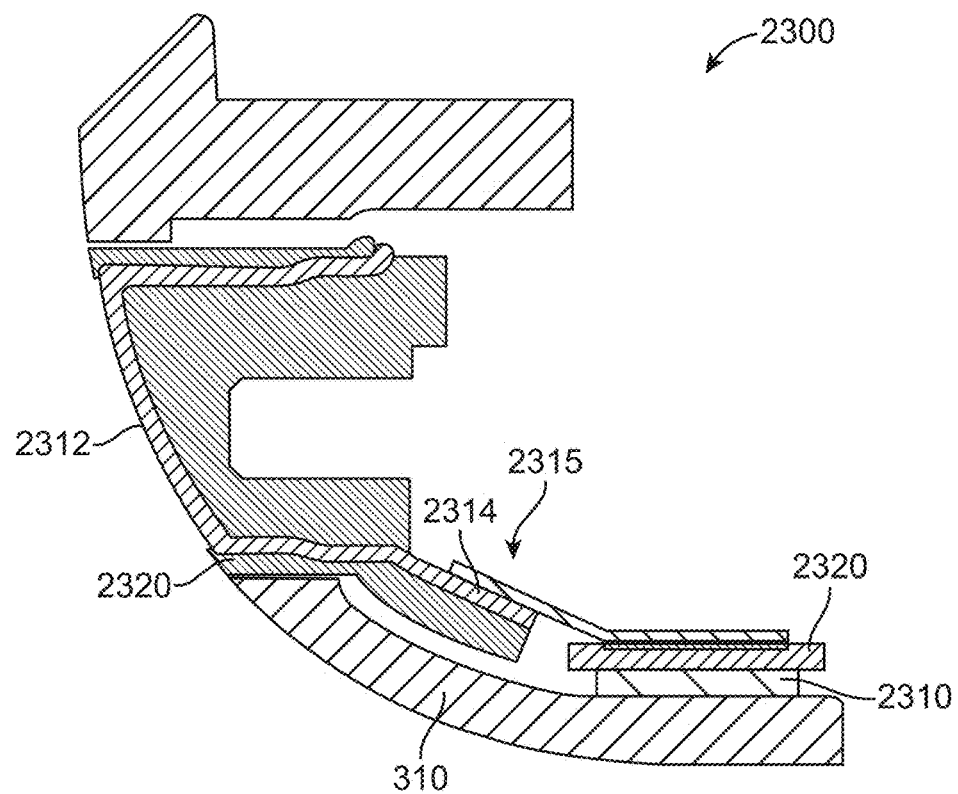
FIG. 23 is a simplified cross-sectional view of an individual contact within the contact structure shown in FIG. 3 taken along line A'-A according to another embodiment of the present disclosure.

FIG. 23 illustrates a cutaway side view of another contact structure 2300 that can be used for the contact structure of FIG. 3. In this example, contact 2312 can be located in an opening in device enclosure 310. A plastic insulator 2320 can be located between contact 2312 and device enclosure 310 and, as evident from FIG. 23, the exterior surface of contact structure 2300 can be an essentially continuous, smooth (to a user's touch) and curved surface across the enclosure, insulating ring and contact. A bridging piece 2315 can connect flexible circuit board 2320 to contact 2312 at rear portion 2314. An optional bracket (not shown) can be used to secure contacts 2312 in place in device enclosure 310, though in other embodiments of the present disclosure, contacts 2312 and insulators 2320 can be glued or otherwise fixed in place. In various embodiments of the present disclosure, various adhesives can be used to secure these structures in place. Specifically, adhesive layers can be used to secure contact 2312 to plastic insulator 2320. An adhesive layer can also be used to secure plastic insulator 2320 to device enclosure 310. Also, adhesive layers can be used to secure an optional bracket in place in device enclosure 310. Support 2310 can provide mechanical support for flexible circuit board 2320. Support 2310 can include ESD diodes (as shown below in FIG. 26.)

Figure 24:
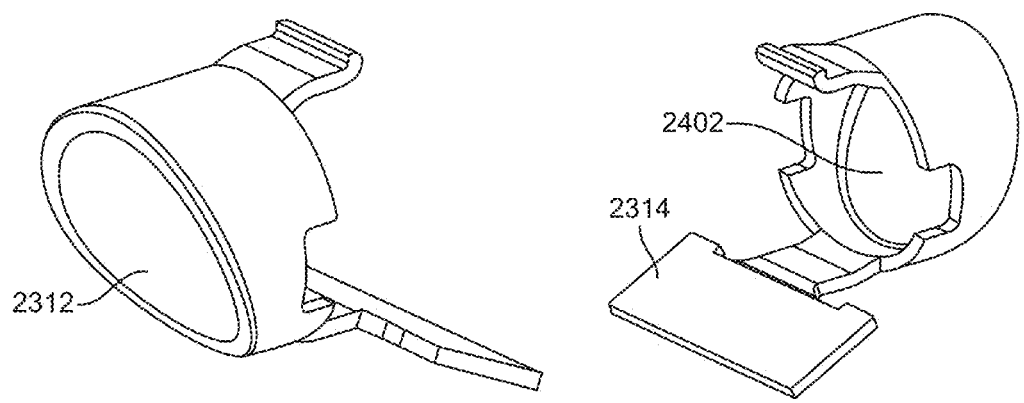
FIG. 24 illustrates the contact of FIG. 23.

FIG. 24 illustrates the contact of FIG. 23. In this example, a force can be applied at surface 2402 to form contacts 2312 in a deep drawn process. As before, contact 2312 can include a rear angle piece 2314 that can be mated with a flexible circuit board. In other embodiment of the present disclosure, contact 2312 can be formed by machining, forging, printing, etching, stamping, or in other ways.

Figure 25:
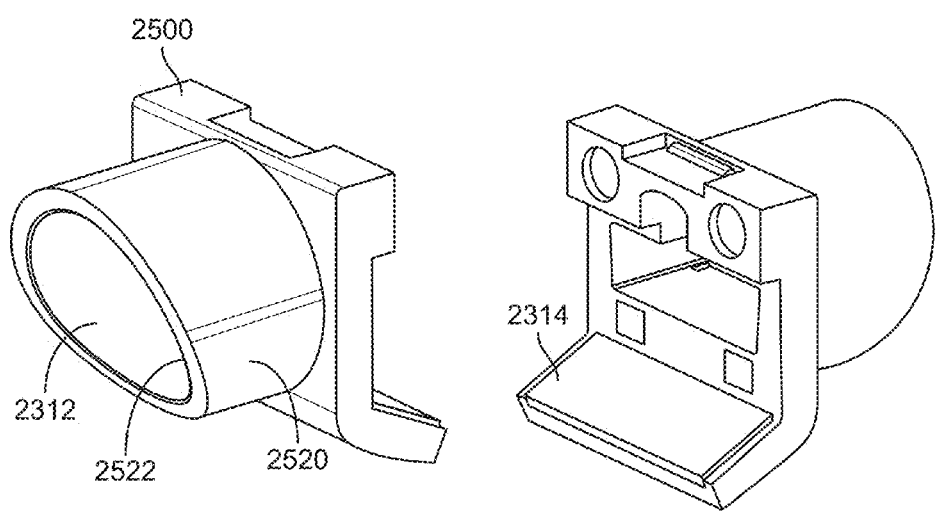
FIG. 25 illustrates the contact of FIG. 24 in a plastic insulator according to an embodiment of the present disclosure.

FIG. 25 illustrates the contact of FIG. 20 in a plastic insulator 2500 according to an embodiment of the present disclosure. In this example, plastic insulator 2500 can have openings 2522 for accepting contacts 2312. Rear contact portions 2314 can extend from insulator 2500.

Figure 26:
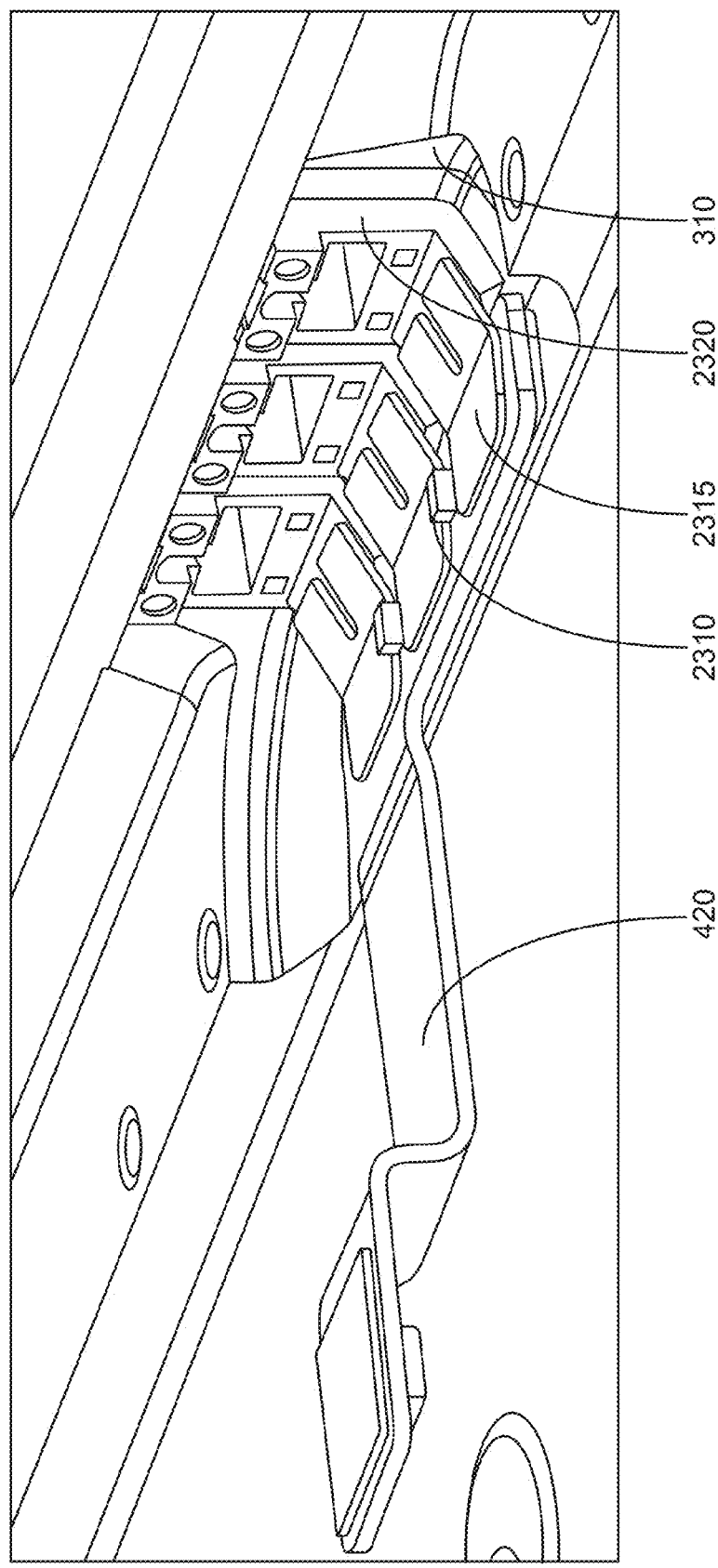
FIG. 26 illustrates an assembled contact structure in an electronic device according to an embodiment of the present disclosure.

FIG. 26 illustrates an assembled contact structure according to an embodiment of the present disclosure. A number of contacts 2312 (not shown) in insulators 2520 can be mated to flexible circuit board 2320 according to an embodiment of the present disclosure. Contacts on flexible circuit board 2320 can be attached to rear portions 2314 of contacts 2312 (as shown in FIG. 9) by soldering, laser, spot, or resistance welding, or by other method. Diodes 1610 can be connected between flexible circuit board traces in flexible circuit board 2320 and the device enclosure 310 to provide ESD protection. In this example, flexible circuit board can be routed laterally along the backside of contacts 2312 to gain flexibility in attaching flexible circuit board 320 to bridging pieces 2315.

FIG. 27 illustrates another contact according to an embodiment of the present disclosure. This contact 2712 can include a contacting portion emerging from a front face 2713. Contacts 2712 can further have a rear angle portion 2714 that can connect to flexible circuit board 320. Contact 2712 can be formed by machining, forging, printing, etching, stamping, or in other ways. In other embodiment of the present disclosure, contacts 2712 can be formed by a deep drawn process.

FIG. 28 illustrates contacts of FIG. 27 in a plastic insulator according to an embodiment of the present disclosure. In this example, plastic insulator 2820 can have openings 2822 for accepting contacts 2712. Rear contact portions 2714 (not shown) can extend from insulator 2820.

Figure 29:
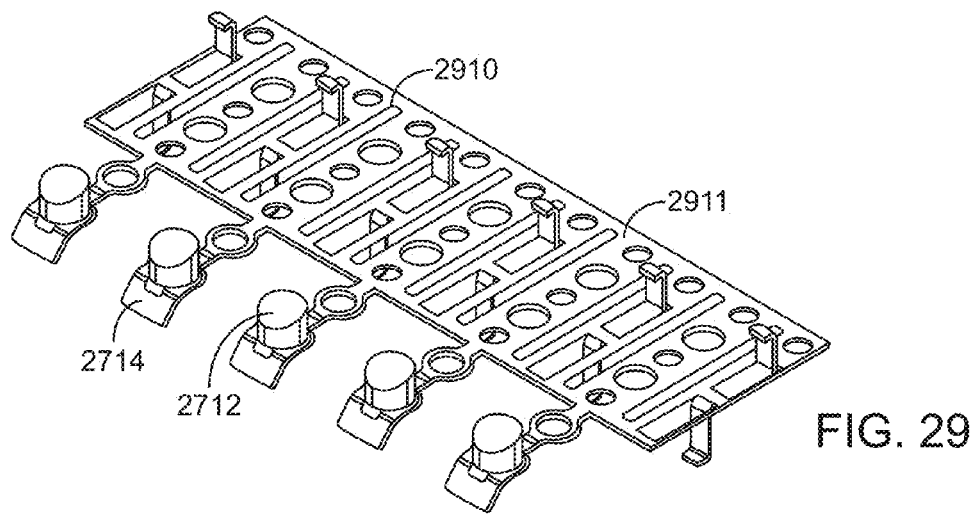
FIGS. 29-34 illustrate a method of assembling a contact structure in an electronic device according to an embodiment of the present disclosure.
Figure 30:
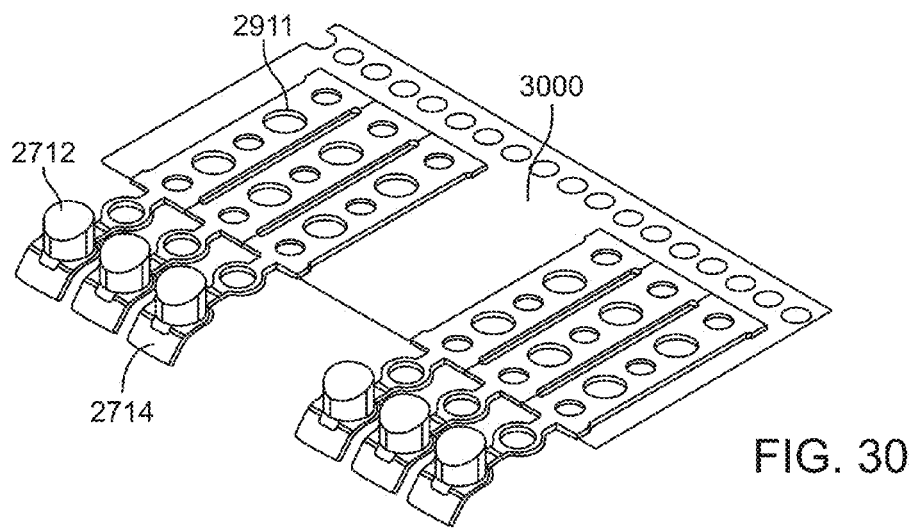
Figure 31:
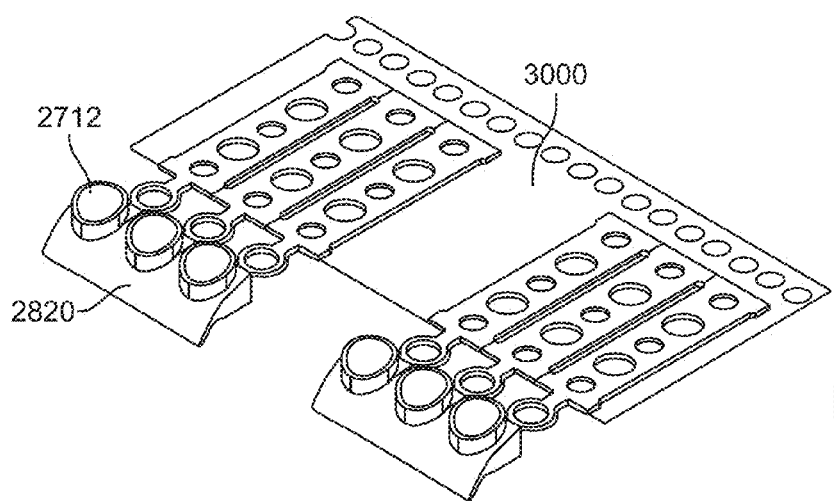

FIGS. 29-34 illustrate a method of making another contact structure according to an embodiment of the present disclosure. In FIG. 29, a plurality of contacts 2712 can be stamped at ends of a carrier 29110. Each contact 2712 can include a rear angled portion 2714. The contacts can be blasted and plated. In FIG. 30, portions 2911 of the carrier 2910 can be split and placed on a dummy carrier 3000 such that contacts 2712 can have the same special relationship to each other as they will when placed in a device enclosure. In FIG. 31, plastic insulators 2820 can be formed around contacts 2712. In other embodiments of the present disclosure, plastic insulators 2820 can be formed in a separate step and then placed around contacts 2712. In these and other embodiments of the present disclosure, instead of one plastic insulator 2820, three plastic insulators or insulators can be used, each around one of the contacts 2712. Plastic insulators 2820 can be glued or otherwise fixed to contacts 2712. Dummy carrier 3000 can be removed.

Figure 32:
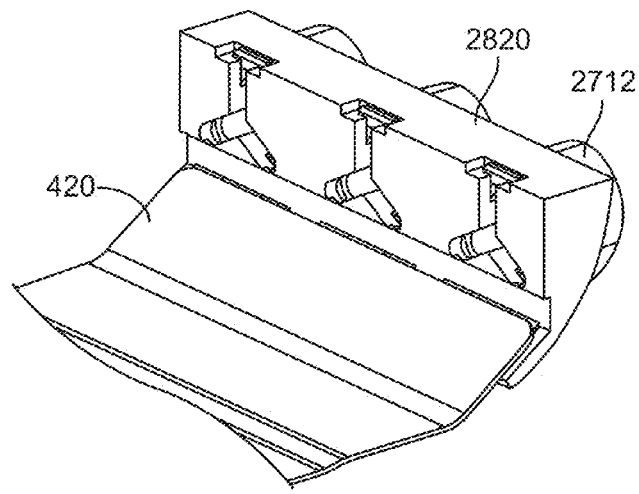
Figure 33:
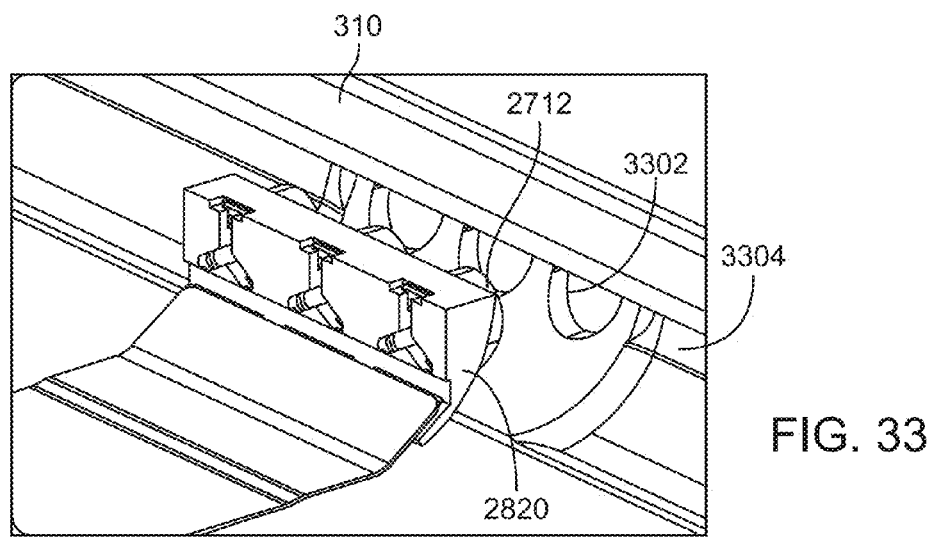
Figure 34:
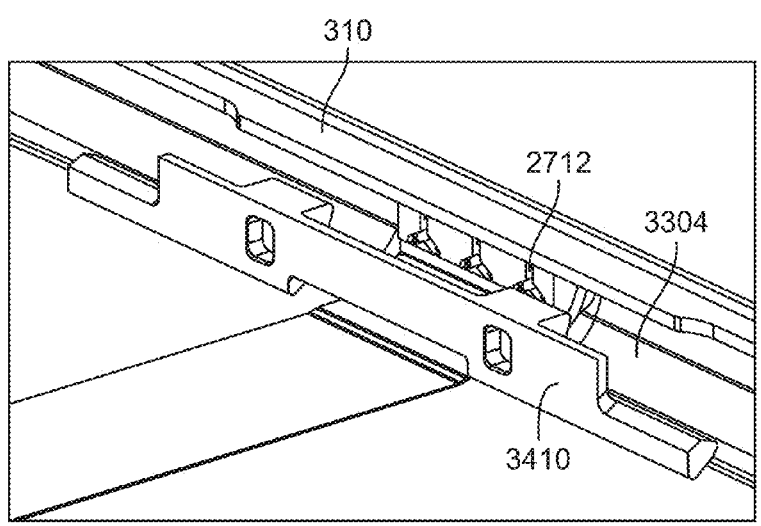

In FIG. 32, flexible circuit board 320 can be attached, for example by soldering, to rear angled pieces 2714 of contacts 2712. Contacts 2712 can be insulated by plastic insulator 2820. In FIG. 33, contacts 2712 can be aligned with openings 3302 in device enclosure 310. Plastic insulating piece 2820 can be arranged to fit in notch 3304 in device enclosure 310 and can be glued in place. In FIG. 34, bracket can be placed behind contacts 2712 in notch 3304 of device enclosure 310 to secure contacts 2712 in place. Bracket 3410 can be glued in place to further secure contacts 2712 to device enclosure 310.

Figure 35:
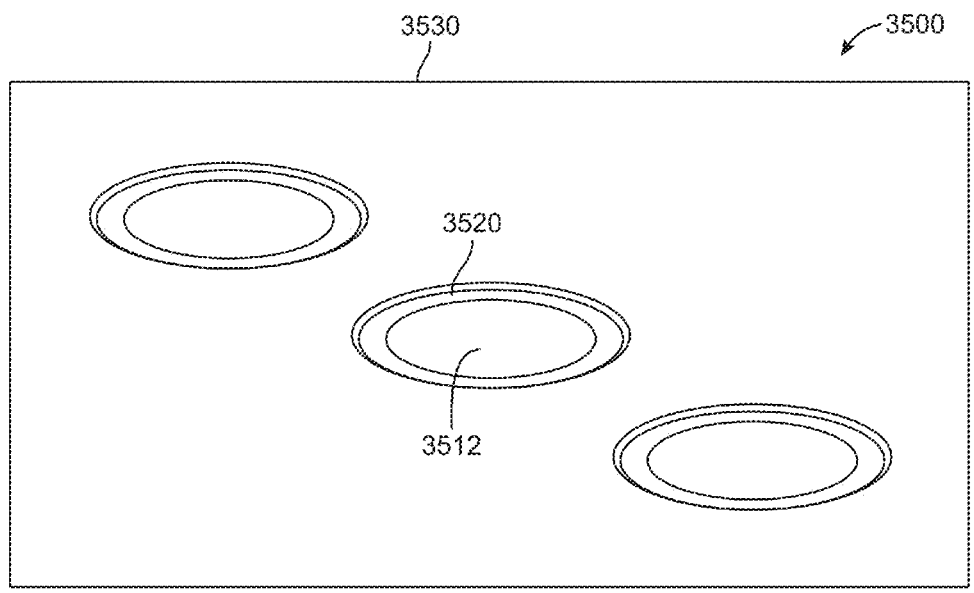
FIG. 35 illustrates a contact structure in a device enclosure according to an embodiment of the present disclosure.

FIG. 35 illustrates a contact area 3500 in a device enclosure according to an embodiment of the present disclosure. In this example, contact area 3500 include three contacts 3512 at a surface of a device enclosure 3530. An insulating ring formed by a plastic insulator 3520 can surround an outside edge of contacts 3512 and can be located between contacts 3512 and device enclosure 3530. As shown in FIG. 35 contacts 3512 and the insulating ring formed by plastic insulator 3520 can be substantially flush with a surrounding surface of device enclosure 1730. These surfaces can be curved, they can be substantially flat, or they can have other contours and the contacts, insulating ring and surrounding exterior surface can combine to form a continuous smooth exterior surface of the device that contact area 3500 is incorporated into.

Figure 36:
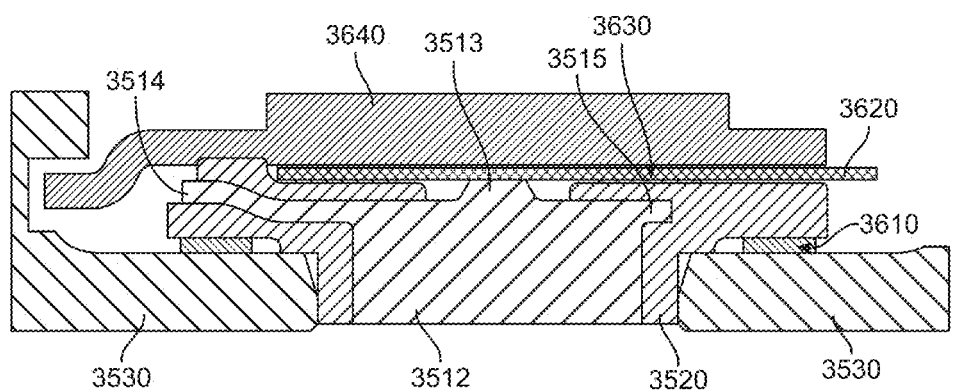
FIG. 36 illustrates a cutaway side view of an individual contact that can be incorporated into the contact structure of FIG. 35 according to an embodiment of the disclosure.

FIG. 36 illustrates a cutaway side view of a contact structure that can be used as the contact structure of FIG. 35. Again, contacts 3512 can be located in openings in device enclosure 3530. Plastic insulator 3520 can be located between contact 3512 and device enclosure 3530. A surface of contact 3512 and a surface of plastic insulator 3520 can be substantially flush with a surface of device enclosure 3530. These surfaces can be curved, substantially flat, or they can have other contours. A silicone gasket or other seal 3610 can be located between plastic insulator 3520 and device enclosure 3530. Silicone gasket 3610 can prevent the ingress of liquids, moisture, or debris into the electronic device. Contacts 3512 can include a contacting portion 3513 that can be soldered or otherwise attached to a trace on flexible circuit board 3620. A heat-activated film or adhesive 3630 can be used to fix flexible circuit board 3620 to plastic insulator 3520. Contact 3512 can further include tabs 3515 (of which contacting portion 3513 may be one of) and handle 3514. Bracket 3640 can be located behind flexible circuit board 3620 and can hold contact 3512 in place in device enclosure 3530.

In various embodiments of the present disclosure, it may be desirable that a surface of contacts in a contact structure to be at least substantially flush with a surface of a device housing the contacts. But the sizes of the various components of this connector structure each have a manufacturing tolerance associated with them. The accumulation of these tolerances can lead to the surface of one or more contacts not being flush with a surface of the device. Accordingly, embodiments of the present disclosure can employ shims or other adjustments features to account for the errors that these tolerances can create. An example is shown in the following figures.

FIG. 37 illustrates a cutaway side view of another contact structure that can be used as the contact structure of FIG. 35. Again, contacts 3512 can be located in openings in device enclosure 3530. Plastic insulator 3520 can be located between contact 3512 and device enclosure 3530. A surface of contact 3512 and a surface of plastic insulator 3520 can be substantially flush with, or recessed a limited amount relative to, a surface of device enclosure 3530. The surface of contact 3512, the surface of plastic insulator 3520, and the surface of device enclosure 3530 can be curved, substantially flat, or they can have other contours. A silicone gasket or other seal 3610 can be located between plastic insulator 3520 and device enclosure 3530. Silicone gasket 3610 can prevent the ingress of liquids, moisture, or debris into the electronic device. Contacts 3512 can include a contacting portion 3513 that can be soldered or otherwise attached to a trace on flexible circuit board 3620. A heat-activated film or adhesive 3630 can be used to fix flexible circuit board 3620 to plastic insulator 3520. Contact 3512 can further include tabs 3515 (of which contacting portion 3531 can be one of) and handle 3514. Bracket 3640 can be located behind flexible circuit board 3620 and can hold contact 3512 in place in device enclosure 3530.

Again, it may be desirable that the surface of contact 3512 and a surface of plastic insulator 3520 be substantially flush with a surface of device enclosure 3530. But the sizes of the various components of this connector structure each have a manufacturing tolerance associated with them. The accumulation of these tolerances can lead to the surface of one or more contacts 3512 not being flush with a surface 3530 of the device. Accordingly, embodiments of the present disclosure can employ shims 3710. Shim 3710 can be selected from a set of shims having different sizes. Shim 3710 can have a size that is selected to compensate for the accumulated tolerances of the sizes of the different components in this connector structure such that the surface of contact 3512 and a surface of plastic insulator 3520 can be substantially flush with a surface of device enclosure 3530.

FIG. 38 illustrates a portion of contact structure according to an embodiment of the present disclosure. This contact structure portion can include a number of contacts 3512 surrounded by plastic insulator 3520.

Figure 39:
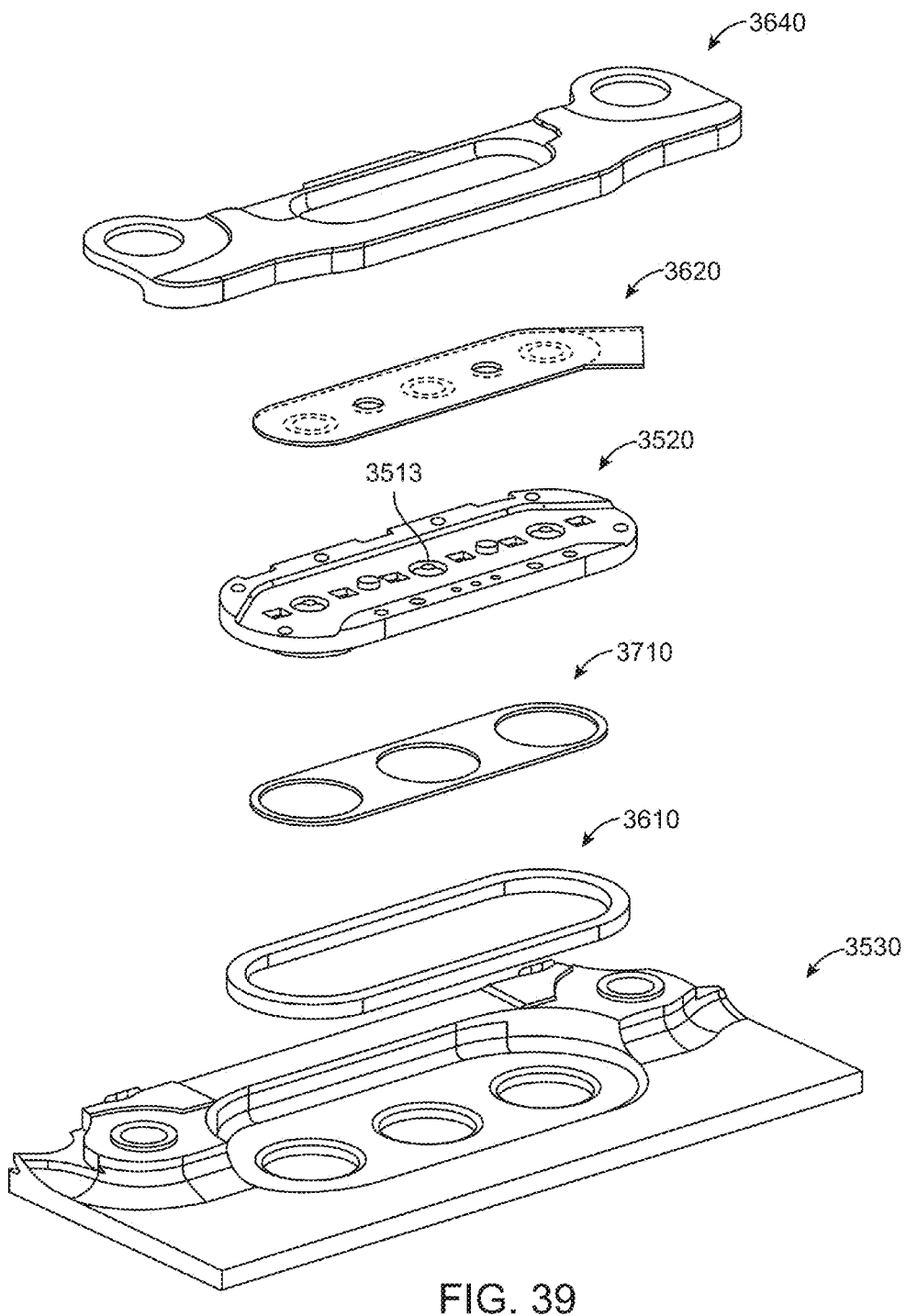
FIG. 39 is an exploded view of a contact structure according to an embodiment of the disclosure.

FIG. 39 is an exploded view of a contact structure according to an embodiment of the present disclosure. Contacts 3512 (shown in FIG. 38) can be housed in plastic insulator 3520, and can be located in openings in device enclosure 3530. A silicone gasket or other seal 3610 can be located between plastic insulator 3520 and device enclosure 3530. Silicone gasket 3610 can prevent the ingress of liquids, moisture, or debris into the electronic device. Contacts 3512 can include a contacting portion 3513 (shown in FIG. 28) that can be soldered or otherwise attached to a trace on flexible circuit board 3620. A heat-activated film or adhesive (not shown) can be used to fix flexible circuit board 3620 to plastic insulator 3520. Bracket or cowling 3640 can be located behind flexible circuit board 3620 and can hold contacts 3512 in place in device enclosure 3530. Shim 3710 can be placed between plastic insulator 3520 and device enclosure 3530. Shim 3710 can be selected from a set of shims having different sizes. Shim 3710 can have a size that is selected to compensate for the accumulated tolerances of the sizes of the different components in this connector structure such that the surface of contact 3512 and a surface of plastic insulator 3520 can be substantially flush with a surface of device enclosure 3530.

These contacts structures portions including contacts 3512 and plastic insulators 3520 can be formed in various ways. Examples are shown in the following figures.

Figure 40:
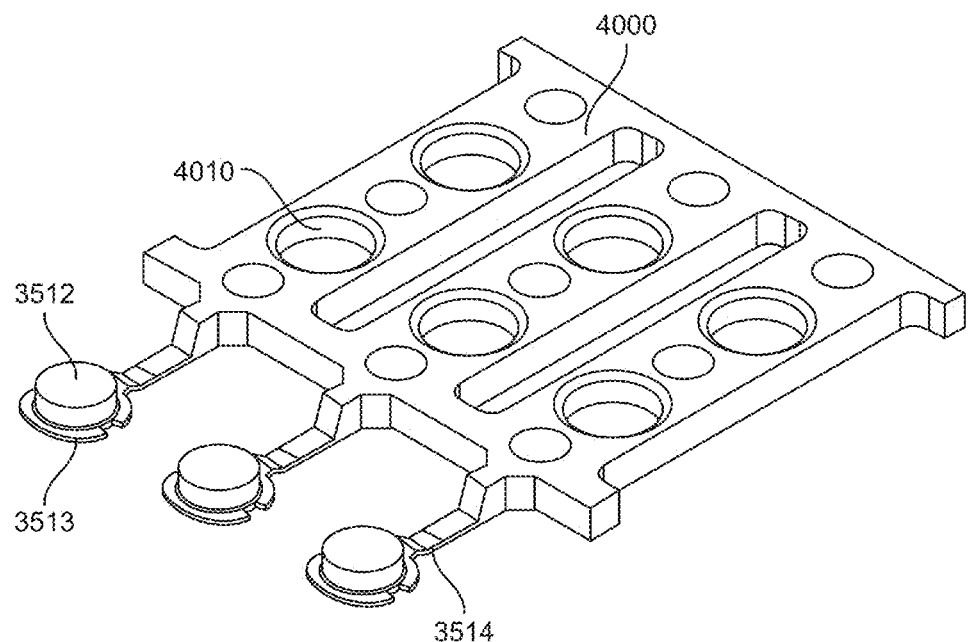
FIGS. 40-43 illustrates a method of manufacturing a portion of a contact structure according to an embodiment of the disclosure.
Figure 41:
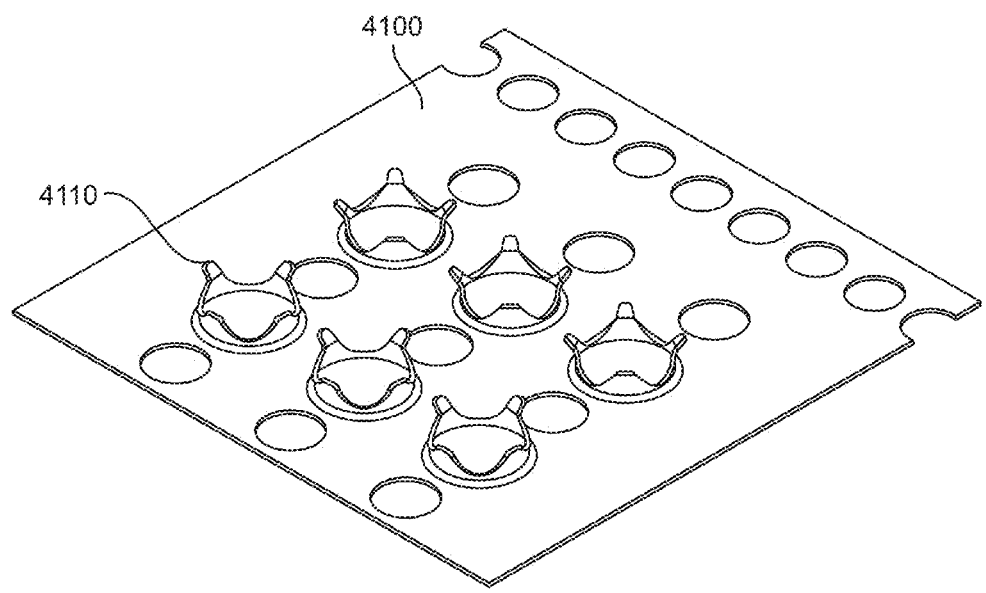
Figure 42:
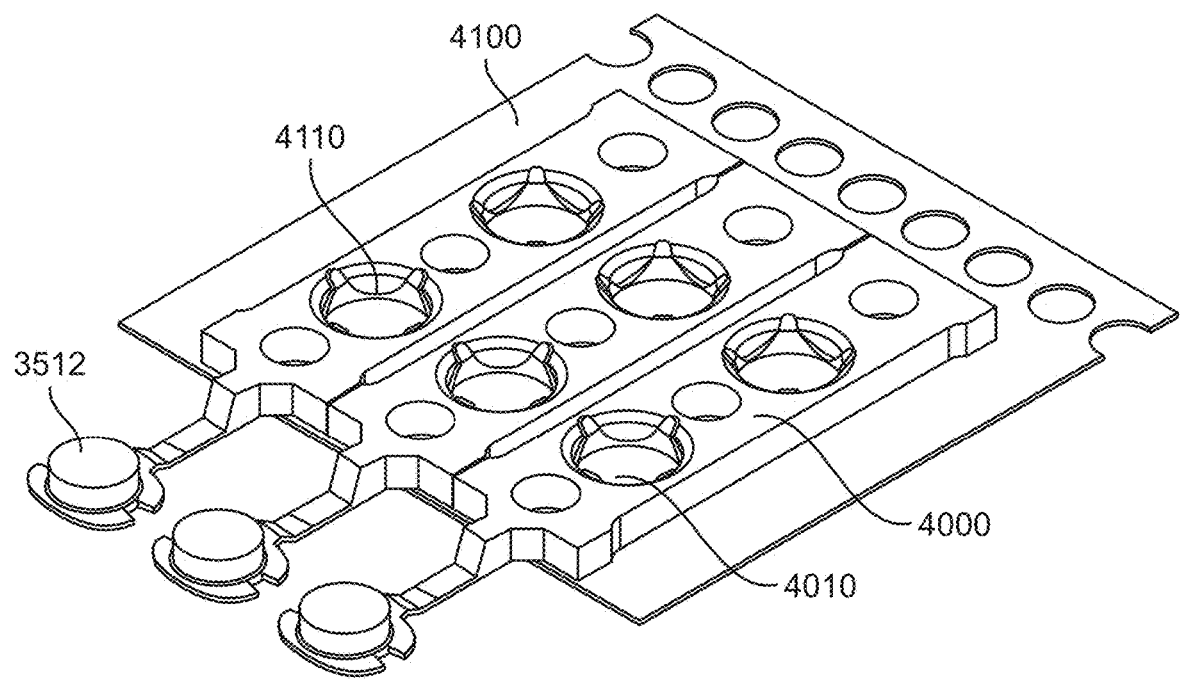
Figure 43:
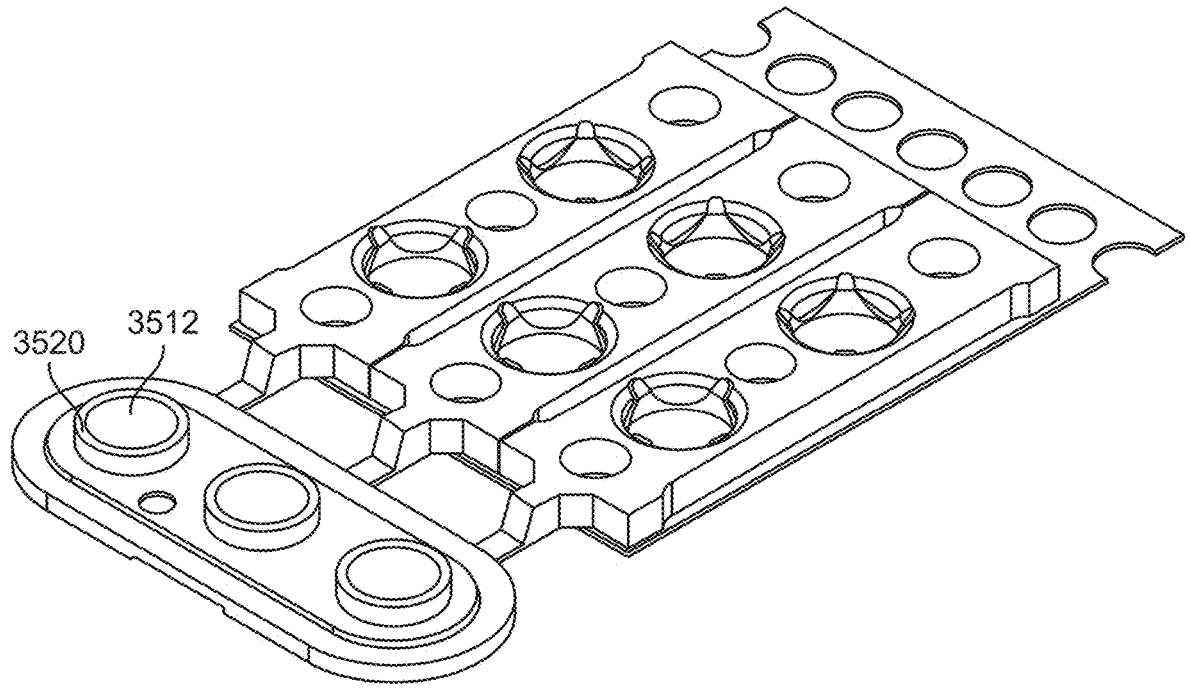

FIGS. 40-43 illustrates a method of manufacturing a portion of a contact structure according to an embodiment of the present disclosure. In FIG. 40, contacts 3512 can be coined. The coining process can leave tab 3513 and handle 3514 in place. Contacts 3512 can be formed at ends of carrier 4000. Carrier 4000 can include openings 4010. In FIG. 41, a carrier 4100 can be provided. Openings 4100 having raised edges can be stamped in carrier 4100. In FIG. 42, carrier 4000 can be fixed to carrier 4100. Specifically, raised edges of opening 4110 can be placed in openings 4010 of carrier 4000. In FIG. 43, plastic insulator 3520 can be formed around contacts 3512. In other embodiments of the present disclosure, plastic insulator 3520 can be formed elsewhere and glued or otherwise fixed to contacts 3512. The carrier structure can be removed leaving behind handle 3514 (not shown).

Figure 44:
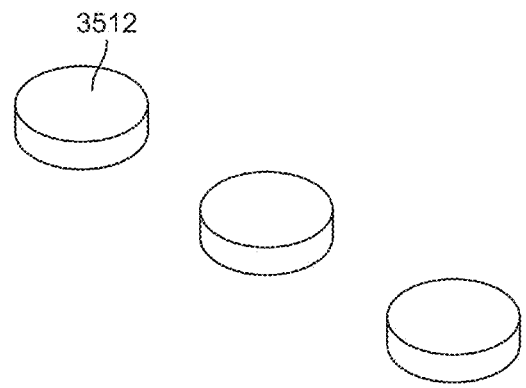
FIGS. 44-47 illustrates another method of manufacturing a portion of a contact structure according to an embodiment of the disclosure.
Figure 45:
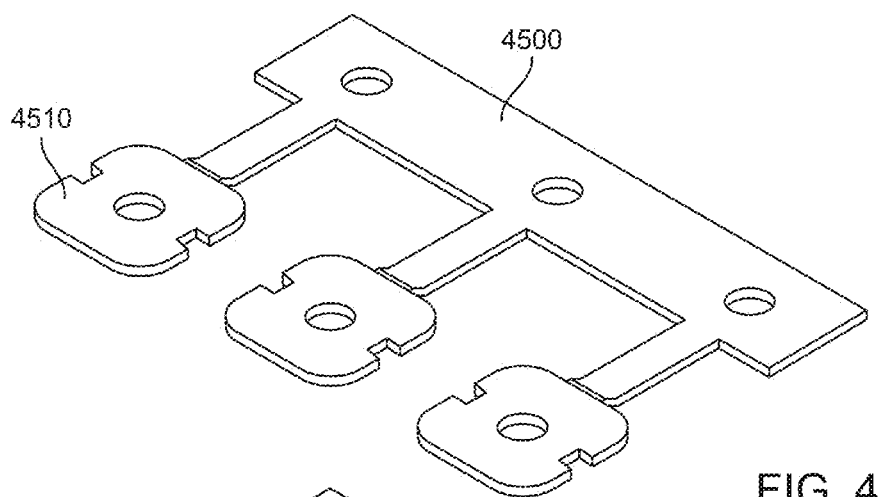
Figure 46:
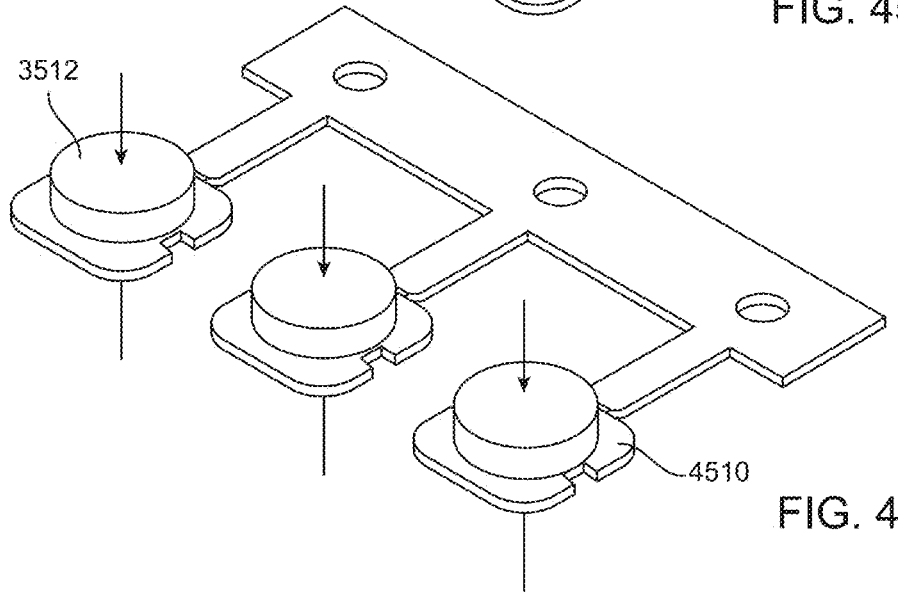
Figure 47:
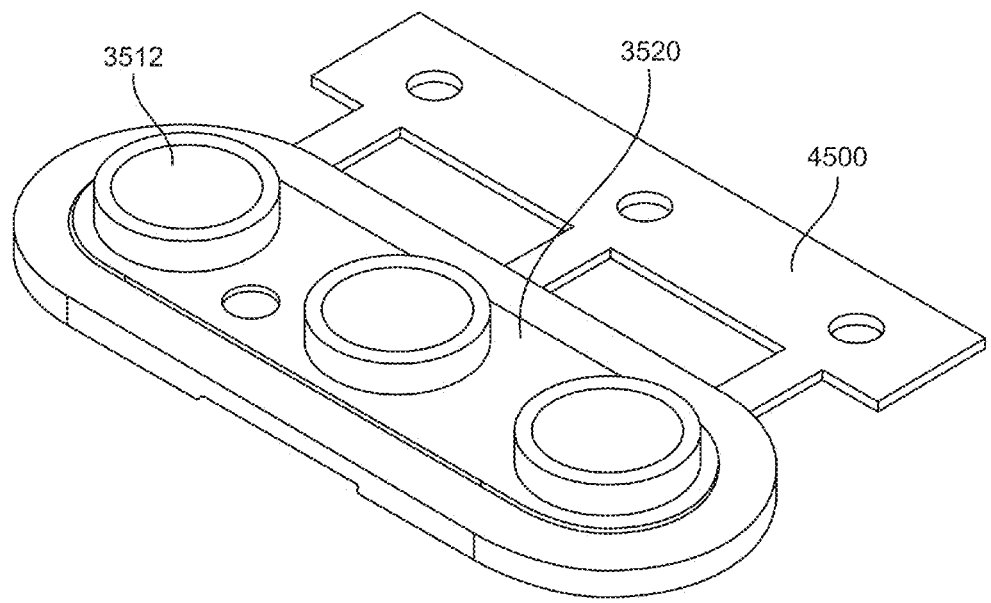

FIGS. 44-47 illustrates another method of manufacturing a portion of a contact structure according to an embodiment of the present disclosure. In FIG. 44, contacts 3512 can be turned or machined. In FIG. 45, a carrier 4500 can be stamped. Carrier 4500 can include paddles 4510. In FIG. 46, contacts 3512 can be attached to paddles 4510 of carrier 4500. In FIG. 47, plastic insulator 3520 can be formed around contacts 3512. In other embodiments of the present disclosure, plastic insulator 3520 can be formed elsewhere and then fixed to contacts 3512, by using an adhesive or other technique. Carrier 4500 can be removed, again leaving behind handle 3514 (not shown.)

Figure 48:
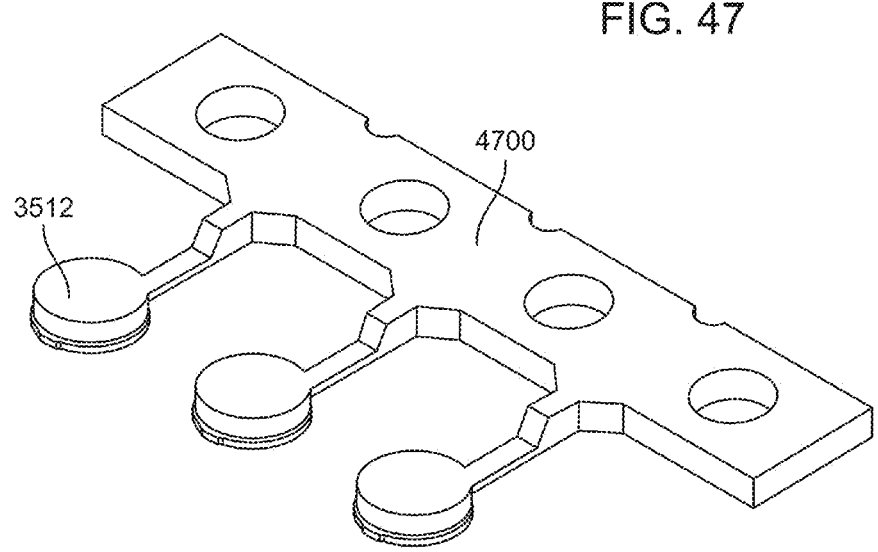
FIGS. 48-52 illustrates a method of manufacturing a portion of a contact structure according to an embodiment of the disclosure.
Figure 49:
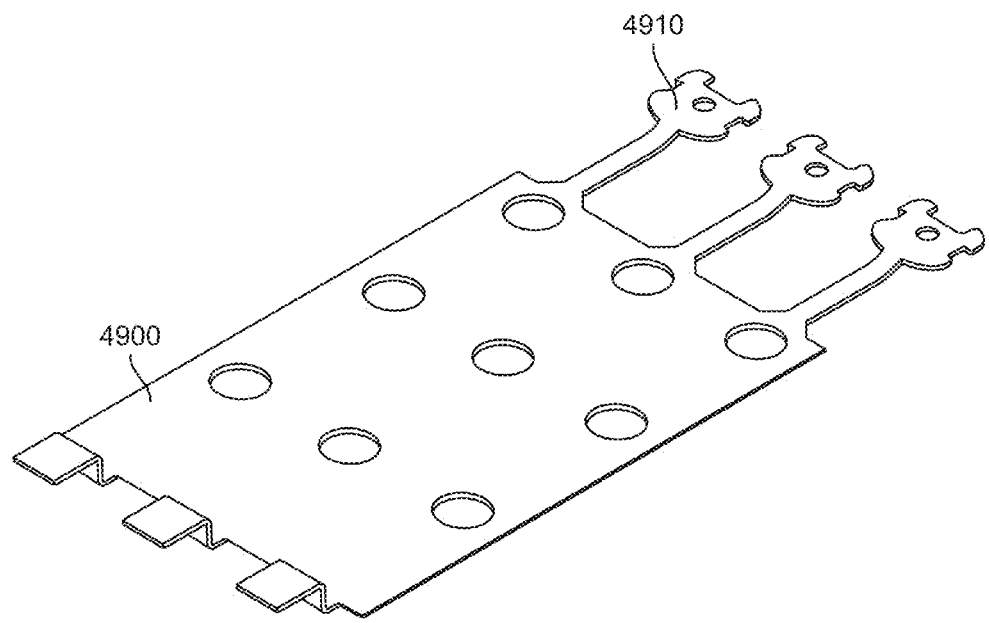
Figure 50:
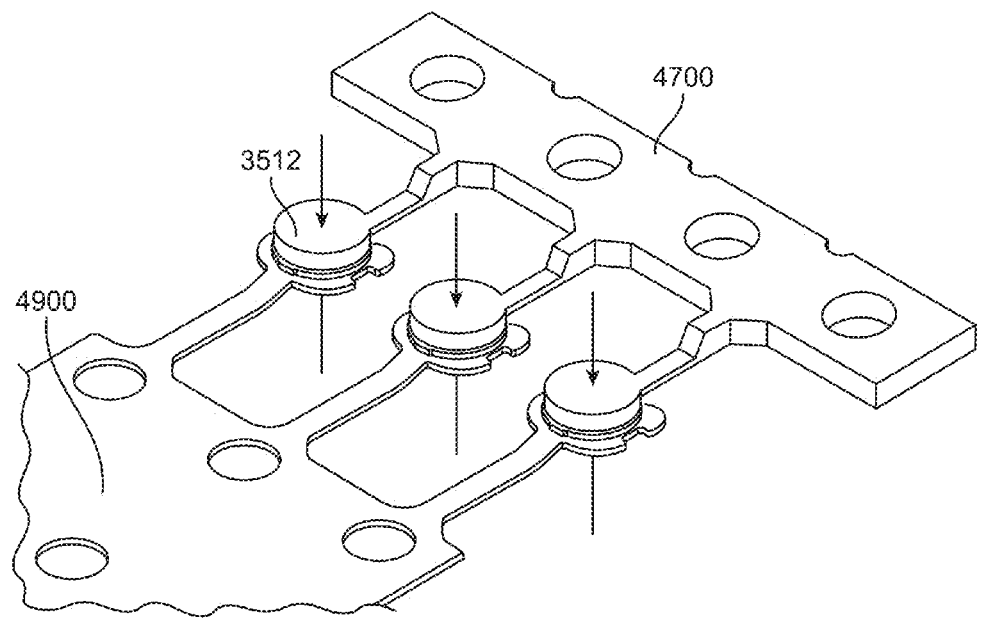
Figure 51:
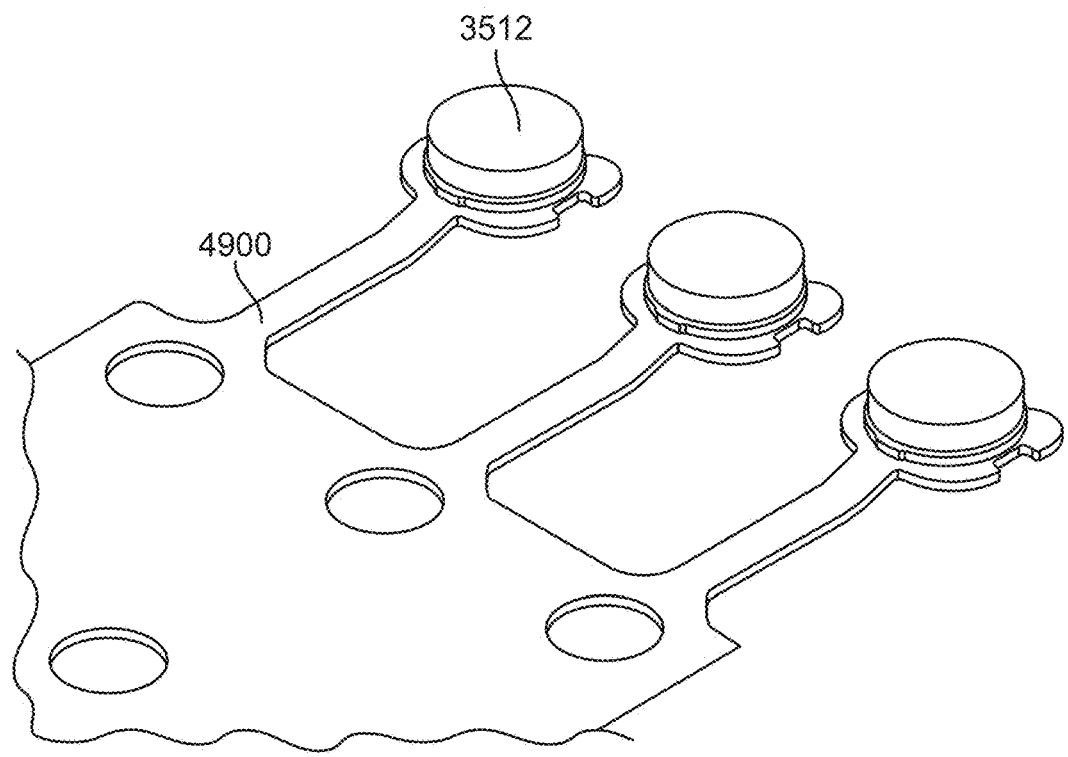
Figure 52:
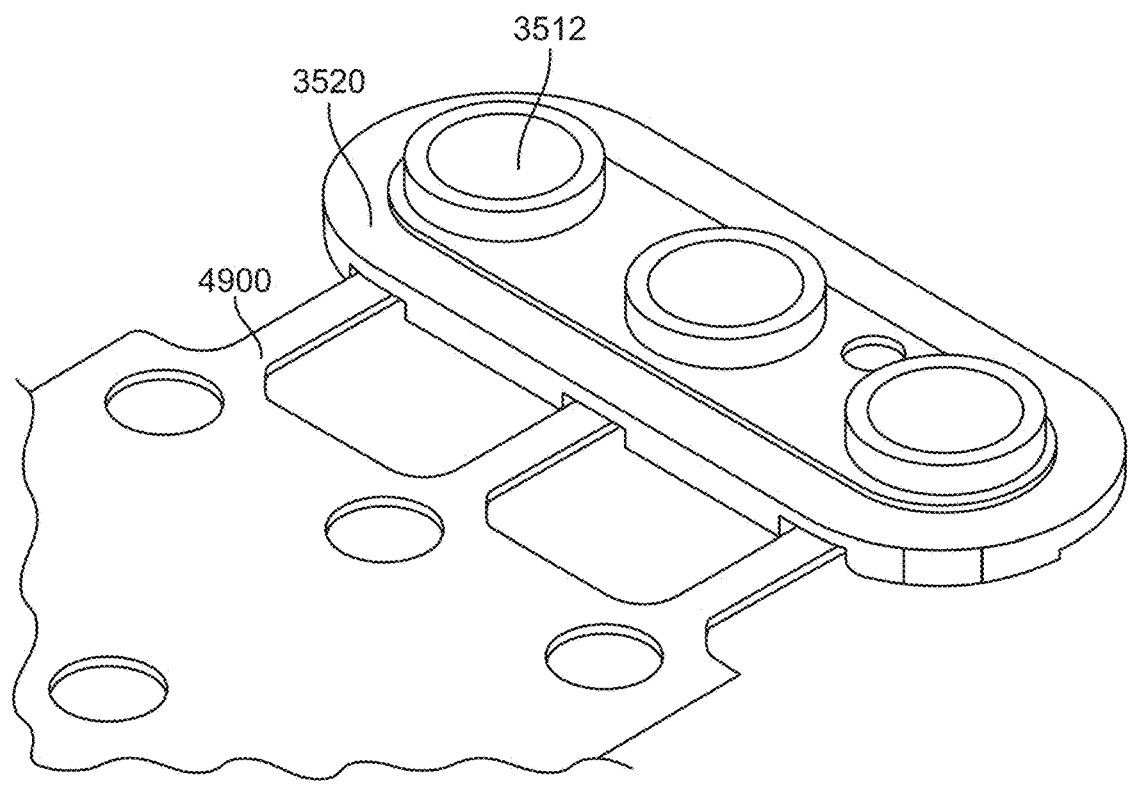

FIGS. 48-52 illustrates another method of manufacturing a portion of a contact structure according to an embodiment of the present disclosure. In FIG. 48, contacts 3512 and first carrier 4700 can be turned, or machined, forged, or formed in other ways. In FIG. 49, second carrier 4900 can be stamped or formed in other ways. Second carrier 4900 can include paddles 4910. In FIG. 50, contacts 3512 can be attached to paddles 4910 of second carrier 4900 by spot, laser, or resistance welding, or other technique. In FIG. 51, the first carrier 4700 can be detached, and the contacts 3512 can be polished, blasted, and plated. In FIG. 52, plastic insulator 3520 can be formed around contacts 3512 using an overmold or other process. In other embodiments of the present disclosure, plastic insulator 3520 can be formed elsewhere and then fixed to contacts 3512, by using an adhesive or other technique. Carrier 4900 can be removed, again leaving behind handle 3514 (not shown.)

Embodiments of the present disclosure can provide contacts that are resistant to corrosion. These contacts can include a top, electrically conductive plate to match a color of a device enclosure around the contacts. This top plate can be between 0.25 to 1.0 microns, between 0.5 to 1.0 microns, between 0.5 to 0.85 microns, between 0.75 to 0.85 microns thick, or it can have another thickness. At an exposed surface of the contact, gold plating layer can be below the top plate. On other portions of the contact, the top plate can be omitted and the gold plating layer can be the first layer. This layer can be between 0.01 to 0.5 microns or between 0.05 and 0.1 microns thick, or it can have another thickness. A copper layer in the range of 1.0, 2.0, 3.0 or 4.0 microns in thickness can be used. An optional palladium layer can be used above the copper layer. This layer can have a thickness between 0.15 and 2.0 microns, 1.0 and 1.5 microns, 1.0 and 2.0 microns, or it can have another thickness. An optional SnCu layer can be used between a gold layer and a copper layer in areas where contacts can be soldered to flexible circuit boards. This optional SnCu layer can be between 4, 5, and 6 microns in thickness, for example, between 4 and 6 or between 5 and 6 microns in thickness, though it can have other thicknesses consistent with embodiments of the present disclosure. Another embodiment of the present disclosure can include a base layer of copper in the range of 1.0, 2.0, 1.0-2.0, 2.0-3.0, 3.0 or 4.0 microns in thickness. A palladium layer can be used above the copper layer. This layer can have a thickness between 0.15 and 2.0 microns, 1.0 and 1.5 microns, 1.0 and 2.0 microns, or it can have another thickness. A gold flash can be placed on that layer. This can be followed by a top plating to match a color of a device enclosure around the contacts and/or to improve electrical conductivity. This top plate can be between 0.25 to 1.0 microns, between 0.5 to 1.0 microns, between 0.5 to 0.85 microns, between 0.75 to 0.85 microns thick, or it can have another thickness. Other portions of the contacts can have the copper layer, a thinner Pd layer in the range of one, two, or threes tenth of a micron can be used, followed by a gold flash.

In various embodiments of the present disclosure, different portions of these contact structures and other contact structures can be formed of various materials. For example, bracket 3640 and plastic insulators 1720 can be formed of the same or different materials, such as plastic, LPS, or other non-conductive or conductive material. Contacts 1712 can be formed of noncorrosive materials, such as gold, gold plated copper, gold plated nickel, gold-nickel alloy, and other materials. Also, in various embodiments of the present disclosure, different portions of these contact structures and other contact structures can be formed in various ways. For example, bracket 3640 and plastic insulators 3520 can be formed using injection or other molding, printing, or other technique. Contacts 3512 can be machined, stamped, coined, forged, printed, or formed in different ways. Plastic insulator 3520 can be formed around contacts 3512 using injection molding or other technique.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device comprising:
a device enclosure having an exterior surface;
a contact area positioned at the exterior surface and having first and second ends, the contact area having a plurality of contacts arranged between the first and second ends and substantially flush with the exterior surface;
an alignment feature within the enclosure comprising first and second magnets positioned on opposing sides of the contact area, the first magnet positioned adjacent to the first end of the contact area and the second magnet positioned adjacent to the second end of the contact area;
wherein the device enclosure comprises an electrically conductive material in the contact area and includes an opening formed through the electrically conductive material; and wherein the electronic device further comprises an insulator positioned in the opening that surrounds, and is substantially flush with, a contact in the plurality of contacts electrically isolating the contact from the device enclosure.

2. The electronic device set forth in claim 1 wherein:
the device enclosure comprises an electrically conductive material in the contact area and includes a plurality of openings formed through the electrically conductive material corresponding in number to the plurality of contacts;
each contact in the plurality of contacts is positioned within one of the openings in the plurality of openings; and
the electronic device further comprises an insulator positioned in each of the plurality of openings that forms a ring surrounding the contact in the opening electrically isolating the contact from the device enclosure.

3. The electronic device set forth in claim 2 wherein the exterior surface of the housing and exterior surfaces of each of the plurality of contacts and each of the insulating rings combine to form a continuous smooth surface.

4. The electronic device set forth in claim 2 wherein there are no gaps between the exterior surface of the housing each of the plurality of insulating rings and there are no gaps between each contact and its surrounding insulating rings.

5. The electronic device set forth in claim 2 wherein the insulators positioned in each of the plurality of openings are formed of plastic.

6. The electronic device set forth in claim 2 wherein each of the plurality of contacts is recessed 0.5 mm or less from the exterior surface of the contact area surrounding each contact.

7. The electronic device set forth in claim 1 wherein the device enclosure has a curved exterior surface within the contact area and each contact in the plurality of contacts has a curvature at an outer contact surface that corresponds to a curvature of the curved exterior surface.

8. The electronic device set forth in claim 1 wherein the plurality of contacts comprises a plurality of circular contacts spaced apart from each other in a single row.

9. The electronic device set forth in claim 1 wherein the device enclosure forms a cavity and the electronic device further comprises a battery, a processor, and a computer-readable memory positioned within the cavity.

10. The electronic device set forth in claim 9 wherein the electronic device further comprises a display and a transparent cover glass coupled to the enclosure and a display positioned within the cavity adjacent to the cover glass.

11. The electronic device set forth in claim 10 wherein the display comprises a touch screen.

12. The electronic device set forth in claim 11 wherein the electronic device comprises a tablet computer.

13. The electronic device set forth in claim 1 wherein the alignment feature comprises first and second arrays of magnets positioned on opposing sides of the contact area, the first array of magnets positioned adjacent to the first end of the contact area and the second array of magnets positioned adjacent to the second end of the contact area.

14. An electronic device comprising:
a device enclosure that forms a cavity, the device enclosure having an exterior surface;
a processor and a computer-readable memory positioned within the cavity;
a transparent cover glass coupled to the enclosure;
a display positioned within the cavity adjacent to the cover glass;
a battery positioned within the enclosure and operatively coupled to the processor and the display;
a contact area positioned at the exterior surface and having first and second ends, the contact area having:
(i) a plurality of circular contacts spaced apart from each other in a single row between the first and second ends, each of the plurality of circular contacts being positioned within an opening formed through device enclosure and having an exterior surface that is flush with, or recessed less than one millimeter from, an exterior surface of the device enclosure in the contact area; (ii) an insulator positioned in each of the plurality of openings that forms a ring surrounding the contact in the opening isolating the contact from the device enclosure; wherein the exterior surface of the housing and exterior surfaces of the plurality of circular contacts and the exterior surface of the plurality of insulator rings combine to form a continuous smooth surface;
an alignment feature within the enclosure comprising first and second arrays of magnets positioned on opposing sides of the contact area, the first array of magnets positioned adjacent to the first end of the contact area and the second array of magnets positioned adjacent to the second end of the contact area.

15. The electronic device set forth in claim 14 wherein:
the device enclosure is generally rectangular in shape and includes four side surfaces that surround the transparent cover glass and extend from an upper surface of the electronic device defined at least in part by the transparent cover glass to a back surface, each of the four side surfaces having a curved exterior surface; and
the contact area is positioned within a curved portion of one of the side surfaces.

16. An electronic device comprising: a device enclosure having an exterior surface extending across a back wall and one or more sidewalls, wherein the back wall and one or more sidewalls at least partially define an interior cavity; a processor positioned within the cavity; a display spaced a part from the back wall and coupled to the device enclosure; a contact area positioned at the exterior surface and having first and second ends, the contact area having at least one contact positioned between the first and second ends and substantially flush with the exterior surface; and an alignment feature within the enclosure comprising at least one magnet positioned within the device enclosure within or adjacent to the contact area, the device enclosure comprising first and second magnets positioned on opposing sides of the contact area, the first magnet positioned adjacent to the first end of the contact area and the second magnet positioned adjacent to the second end of the contact area, wherein the device enclosure comprises an electrically conductive material in the contact area and includes an opening formed through the electrically conductive material; and wherein the electronic device further comprises an insulator positioned in the opening that surrounds, and is substantially flush with, a contact in a plurality of contacts electrically isolating the contact from the device enclosure.

17. The electronic device set forth in claim 16 wherein the exterior surface of a housing and exterior surfaces of the at least one contact and an insulator combine to form a continuous smooth surface.

18. The electronic device set forth in claim 17 wherein the device enclosure has a curved exterior surface within the contact area and the at least one contact has a curvature at an outer contact surface that corresponds to a curvature of the curved exterior surface.

* * * * *